United States Patent
Mathews et al.

(10) Patent No.: US 12,244,622 B2
(45) Date of Patent: Mar. 4, 2025

(54) METHOD TO DETECT AND DEFEND AGAINST TARGETTED ADVERSARIAL ATTACKS ON A FEDERATED LEARNING SYSTEM

(71) Applicant: U.S. Bancorp, National Association, Minneapolis, MN (US)

(72) Inventors: Sherin Mathews, Fremont, CA (US); Samuel Assefa, Watertown, MA (US)

(73) Assignee: U.S. Bancorp, National Association, Minneapolis, MN (US)

( * ) Notice: Subject to any disclaimer, the term of this patent is extended or adjusted under 35 U.S.C. 154(b) by 199 days.

(21) Appl. No.: 18/079,782

(22) Filed: Dec. 12, 2022

(65) Prior Publication Data

US 2024/0195826 A1    Jun. 13, 2024

(51) Int. Cl.
*H04L 29/06* (2006.01)
*G06N 20/00* (2019.01)
*H04L 9/40* (2022.01)

(52) U.S. Cl.
CPC ......... *H04L 63/1425* (2013.01); *G06N 20/00* (2019.01)

(58) Field of Classification Search
CPC ............................ G06N 20/00; H04L 63/1425
See application file for complete search history.

(56) References Cited

U.S. PATENT DOCUMENTS

| | | | |
|---|---|---|---|
| 2022/0300618 A1* | 9/2022 | Ding | G06F 21/60 |
| 2023/0064674 A1* | 3/2023 | Koenig | G06N 5/022 |
| 2023/0214642 A1* | 7/2023 | Sidahmed | G06N 3/084 |
| | | | 706/25 |
| 2024/0354575 A1* | 10/2024 | Bailey | G06N 3/091 |

OTHER PUBLICATIONS

Li et al., "Lecture 14: Certified Defenses III: Randomized Smoothing," (2019) Retrieved from the Internet: https://jerryzli.github.io/robust-ml-fall19/lec14.pdf (retrieved on Mar. 27, 2023) pp. 1-9.
Yang et al., "Randomized Smoothing of All Shapes and Sizes," (2020) Retrieved from the Internet: https://arxiv.org/abs/2002.08118 (retrieved on Mar. 27, 2023) 49 pages.

* cited by examiner

*Primary Examiner* — Rodman Alexander Mahmoudi
(74) *Attorney, Agent, or Firm* — FOLEY & LARDNER LLP

(57) ABSTRACT

A method comprises transmitting a first client model to a first computing device and a second client model to a second computing device; determining (i) a first predictive score ratio for the first computing device, and (ii) a first predictive score ratio for the second computing device; determining the first computing device and the second computing device match; determining (i) a second predictive score ratio for the first computing device, and (ii) a second predictive score ratio for the second computing device; and detecting an anomaly in the first computing device responsive to (i) the determining the first computing device and the second computing device match, and (ii) determining the second predictive score ratio for the first computing device exceeds the second predictive score ratio for the second computing device by an amount above a difference threshold.

20 Claims, 8 Drawing Sheets

METHOD TO DETECT AND DEFEND AGAINST TARGETTED ADVERSARIAL ATTACKS ON A FEDERATED LEARNING SYSTEM

BACKGROUND

The proliferation of storage and network devices enables a large amount of data to be exchanged and stored. A large amount of data allows analysis or predictions that were not feasible before. For example, a big data analysis performed on millions of accounts may enable online behavior predictions of consumer behavior through a statistical analysis.

Portfolio optimization can involve building and overseeing a selection of investments that will meet the long-term financial goals and risk tolerance of an investor. Although the concept is typically used in the context of investment banking, financial optimization has a wide range of applications in retail banking and everyday financial service provisioning. Having access to a customer's data from multiple financial sources may help provide better personalize recommendations. However, there are problems associated with utilizing external data sources when processing financial data. These problems include the high processing cost incurred to transfer, store, and process a large amount of telemetry data, as well as the high processing costs of securely combining the data to generate desired insights and models.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
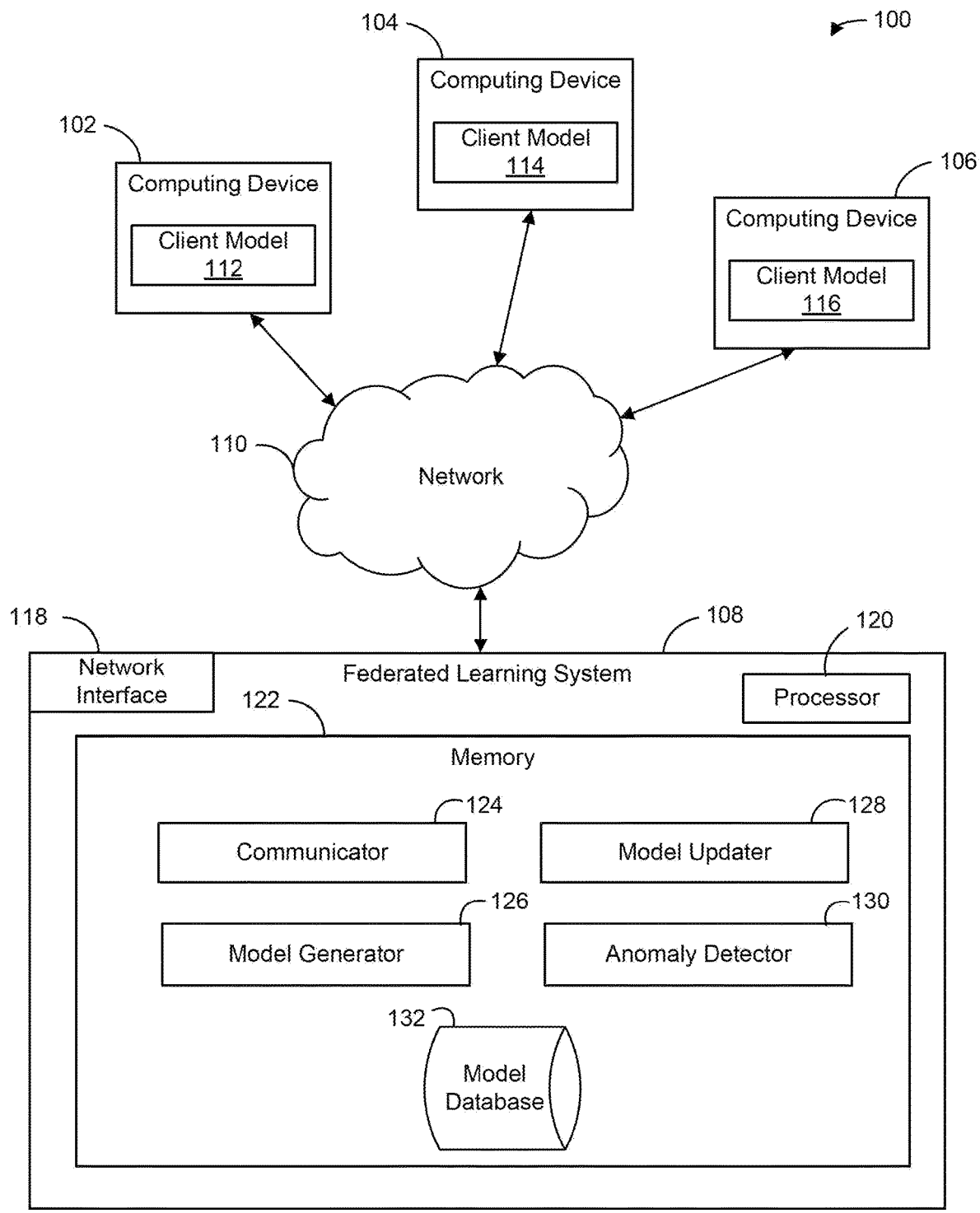
FIG. 1 is an illustration of an example system for detecting anomalous model training, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As previously mentioned, there can be high processing costs that are incurred when processing transaction data across different entities and/or for different accounts and/or account types. Conventional systems may attempt to address these high processing costs by implementing machine learning techniques. For example, computers of financial institutions can retrieve customer information from internal databases (e.g. savings account data, checking account data, investment account data, etc.) that are obtained from the financial institutions' systems or external data sources. These datasets are then exported to analytic servers and normalized into a single view.

The analytic servers of conventional systems may use machine learning techniques to analyze the data. For example, the analytics servers may process the received data to generate an input in the form of feature vectors. The analytics server may input the feature vectors into individual machine learning models that are trained to generate different types of outputs based on such data. In some cases, the machine learning models may be trained to use aggregated information on the customer's past behavioral patterns (e.g., a transaction history) that are incorporated into the customer's input vector. Defining the information that composes the input vector is typically called "feature engineering" and it heavily relies on the knowledge of the data and possible patterns by the data scientists that create the feature set. The machine learning models may be trained to build classification (or regression) rules that are applied to the input vectors to predict recommendations for managing a portfolio of transactions.

Using the aforementioned techniques to analyze data can cause data privacy and security risks, both in the transmission and in the storage of the data at the analytics servers. For example, when the data is transmitted to the analytics server, the data is at risk of being intercepted by sniffers or in man-in-the-middle attacks. Additionally, during storage at the analytics servers, a malicious user may hack into the analytics servers to gain access to the data. Given the analytics servers may store a large amount of data from multiple entities, the hacker may gain access to a large amount of sensitive data upon gaining access to the analytics servers.

One method of reducing the data security and privacy problems inherent to processing data using machine learning techniques at a central location is to use federated learning techniques. Federated learning techniques may avoid data storage and transmission to a central location, instead allowing data to be stored at the locations at which the data was generated. However, such techniques can be susceptible to other security issues. For example, federated learning models can suffer from vulnerability to imperceptible input transformations, known as adversarial attacks, which can limit federated learning in security-sensitive applications. Federated learning models are also susceptible to backdoor attacks, which may include a targeted poisoning attack in which an adversary manipulates the local models of a subset of clients and aims to make the aggregated model output a certain class for a set of input samples.

Implementations of the systems and methods discussed herein overcome these technical deficiencies because they provide a method for detecting anomalies in the client models and/or the training of the client models. The anomalies may indicate the client models (e.g., the computing devices that maintain the client models) and/or the training of the client models that have experienced an adversarial attack. A computer implementing the systems and methods described herein can use a variety of techniques to identify attacked computing devices. In one example, the computer may use a clustering technique to detect anomalies in computing devices. For instance, the computer may transmit client models to different computing devices that maintain the federated learning environment. The computing devices may receive the client models and respectively train the received client models, in some cases using training data the computing devices individually generate. The computer may cluster the computing devices into different clusters based on similarities between outputs of the client models of the computing devices within the separate clusters. The computing devices may then train the client models again, this time using different training data sets. The computer may analyze the outputs of the models within the individual clusters. The computing device may detect an anomaly in a computing device responsive to determining the client model maintained by the computing device generated an output different from other models maintained by computing devices in the same cluster as the computing device.

In another example, the computer may analyze the training data used to train the client models to determine whether the client models have been attacked. The computer may do so by identifying the distributions of class labels that the client models generated based on the training data sets. The computer may determine a homogeneity score for each of the training data sets according to the frequencies of the class labels output based on the respective training data sets. The computer may determine a training data set to have a lower homogeneity score responsive to determining a client model output a single class label based on a training data set at a significantly (e.g., 20%) higher frequency than the average frequency or the next highest frequency class label that the client model output based on the training data set. The computer may determine such homogeneity scores for computing devices for individual training iterations (e.g., iterations of training) based on the training data sets that are used in each training iteration. The computer may compare the homogeneity scores for the same computing device between training iterations. Responsive to determining homogeneity scores in consecutive training iterations are within a threshold of each other, the computer may determine the training of the client model maintained by the computing device is anomalous (e.g., because a hacker is trying to improperly weight the training data). The computer may similarly detect an anomalous training data set in response to determining a client model output a particular class label with a higher frequency than the average frequency or the next highest frequency class label by at least a threshold amount for a single training data set. Accordingly, the computer may detect when computing devices have been attacked during the training of the client models.

In another example, the computer may use a combination of the clustering and training data analysis example methods described above to detect anomalous computing devices. For instance, the computer may contemporaneously perform both of the methods. The computer may be configured to only detect an anomaly in a computing device upon determining the computing device is anomalous using both methods.

FIG. 1 illustrates an example system 100 for detecting anomalous model training, in some embodiments. In brief overview, the system 100 can include computing devices 102, 104, and 106. The computing devices 102, 104, and 106 can communicate with a federated learning system 108 over a network 110. The computing devices 102, 104, and 106 can do so by exchanging messages with the federated learning system 108. The federated learning system 108 can transmit client models 112, 114, and 116 to the computing devices 102, 104, and 106, respectively. The federated learning system may store a global model. The computing devices 102, 104, and 106 can train the client models 112, 114, and 116, respectively, using training data sets generated locally at the computing devices 102, 104, and 106. The computing devices 102, 104, and 106 can transmit updates to the computing devices 102, 104, and 106 identified from the training of the client models 112, 114, and 116 to the federated learning system 108. The federated learning system 108 may analyze the updates and identify anomalies for individual computing devices based on the analysis. The federated learning system 108 may use updates that the federated learning system 108 received from non-anomalous computing devices to train the global model maintained by the federated learning system. These components may operate together to facilitate anomaly detection in a federated learning training environment. System 100 may include more, fewer, or different components than shown in FIG. 1. For example, there may be any number of client devices or computers that make up or are a part of the federated learning system 108 or networks in the system 100.

The computing devices 102-106 and the federated learning system 108 can include or execute on one or more processors or computing devices and/or communicate via the network 110. The network 110 can include computer networks such as the Internet, local, wide, metro, or other area networks, intranets, satellite networks, and other communication networks such as voice or data mobile telephone networks. The network 110 can be used to access information resources such as web pages, websites, domain names, or uniform resource locators that can be presented, output, rendered, or displayed on at least one computing device (e.g., the computing devices 102-106), such as a laptop, desktop, tablet, personal digital assistant, smartphone, portable computers, or speaker. For example, via the network 110, the computing device 102 can transmit data to the federated learning system 108. The federated learning system 108 can analyze the data using a machine learning model trained using federated learning techniques in the system 100.

The computing devices 102-106 and/or the federated learning system 108 can include or utilize at least one processing unit or other logic devices such as a programmable logic array engine or a module configured to communicate with one another or other resources or databases. As described herein, computers can be described as computers, computing devices, or client devices. The computing devices 102-106 may each contain a processor and a memory. The components of the computing devices 102-106 and the federated learning system 108 can be separate components or a single component. System 100 and its components can include hardware elements, such as one or more processors, logic devices, or circuits.

Each of the computing devices 102-106 may be computing devices that operate at different financial institutions or different brick-and-mortar buildings. The operators of such financial institutions or brick-and-mortar buildings may collect data (e.g., transaction data generated for transactions performed at the sites or locations of the respective financial institutions or brick-and-mortar buildings, such as number of transactions, purchase amounts for the individual transactions, category of the items purchased in the transactions, number of items purchased for each transaction, accounts used for the transactions, etc.). The operators may collect such data by storing the data for the individual transactions upon completing the transactions at the point-of-sale devices. The operators may store the data in memory of computers at the locations of the financial institutions or brick-and-mortar buildings. In some embodiments, the operators may store the data in a cloud server, such as a cloud server that partitions the data the cloud server receives according to the financial institutions or brick-and-mortar stores from which the cloud server receives the data. The computing devices 102-106 may store any amount of such data in memory.

The federated learning system 108 may comprise one or more processors that are configured to manage a federated learning environment for analyzing data received from the computing devices 102-106. Based on the analysis, the federated learning system 108 may detect anomalies at the computing device relating to one or more training iterations at the computing device. The federated learning system 108 may comprise a network interface 118, a processor 120, and/or memory 122. The federated learning system 108 may communicate with the computing devices 102-106 via the network interface 118, which may be or include an antenna or other network device that enables communication across a network and/or with other devices. The processor 120 may be or include an ASIC, one or more FPGAs, a DSP, circuits containing one or more processing components, circuitry for supporting a microprocessor, a group of processing components, or other suitable electronic processing components. In some embodiments, the processor 120 may execute computer code or modules (e.g., executable code, object code, source code, script code, machine code, etc.) stored in memory 122 to facilitate the activities described herein. Memory 122 may be any volatile or non-volatile computer-readable storage medium capable of storing data or computer code.

The memory 122 may include a communicator 124, a model generator 126, a model updater 128, an anomaly detector 130, and/or a model database 132, in some embodiments. In brief overview, the components 122-132 may cooperate to maintain a federated learning environment. The components 122-132 may initialize client models and transmit the client models to the computing devices 102-106. The components 122-132 may initialize a global model. The components 122-132 may update the global model based on updates to the client models during training iterations. The components 122-132 may analyze the updates to the client models. The components 122-132 may detect anomalies in the training of client models based on the updates to the client models. The components 122-132 may select which updates to use to update the global model based on the detection of the anomalies.

The communicator 124 may comprise programmable instructions that, upon execution, cause the processor 120 to communicate with the computing devices 102-106. The communicator 124 may be or include an application programming interface (API) that facilitates communication between the federated learning system 108 and other computing devices. The communicator 124 may communicate with the computing devices 102-106 across the network 110.

The communicator 124 can establish connections with the computing devices 102-106. The communicator 124 can establish the connections with the computing devices 102-106 over the network 110. To do so, the communicator 124 can communicate with the computing devices 102-106 across the network 110. In one example, the communicator 124 can transmit syn packets to the computing devices 102-106 and establish the connections using a TLS handshaking protocol. The communicator 124 can use any handshaking protocol to establish connections with the computing devices 102-106.

The model generator 126 may comprise programmable instructions that, upon execution, cause the processor 120 to generate, instantiate, or initialize a global model and/or client models. The global model and client models may be machine learning models (e.g., support vector machines, neural networks, random forests, clustering models, etc.). Each of the global models and the client models may be configured to determine a score or value for a particular metric, such as a credit risk assessment, money management, or a price comparison. The model generator 126 may generate a global model and a set of client models for each metric. The model generator 126 may generate a global model by setting weights and/or parameters for the global model to predefined weights and/or parameters. The model generator 126 may generate the client models by setting the weights and/or parameters for the client models to predefined weights and/or parameters. The model generator 126 may set the global model and client models that correspond to the same metric to have the same defined weights and/or parameters. In some embodiments, the model generator 126 may set different weights for the global model and client models depending on the metric for which the model generator 126 is generating the global model and the client models.

The model generator 126 may generate a global model and client models for a metric. A global model may be a model the model generator 126 generates and maintains in memory (e.g., in the model database 132). The model generator 126 may identify the metric for which the global model and client models are being generated (e.g., based on a user input). The model generator 126 may retrieve the weights and/or parameters from memory based on the identified metric. The model generator 126 may set the weights and/or parameters for the global model and store the global model in memory. The model generator 126 may set the same weights and/or parameters for the client models. The model generator 126 may transmit the generated client models to the computing devices 102-106 as client models 112, 114, and 116. The computing devices 102-106 may respectively receive the client models 112-116 and store the received client models 112-116 in memory. The model generator 126 can similarly generate global models and client models for any number of metrics.

The model generator 126 can store the generated global models in the model database 132. The model database 132 may be a database (e.g., a relational database) stored in the memory 122. The model database 132 may store global models that the model generator 126 generates for different metrics. The model database 132 may store the global models as binary files. The model database 132 may store each of the global models with an association with an identifier of the metric for which the global model is configured or trained to generate a value or score. The model database 132 may store any number of global models.

The computing devices 102-106 may train the client models 112-116 stored locally at the computing devices 102-106. For example, each of the computing devices 102-106 may store data generated from transactions performed at the locations or sites at which the computing devices 102-106 are geographically or physically located or for which the computing devices store data. The computing devices 102-106 may generate feature vectors from the data generated at the respective locations and/or sites. The computing devices 102-106 (e.g., via operators of the computing devices) may label the feature vectors with ground truth values of the metric for which the feature vectors are being used to train the client models 112-116. Each of the computing devices 102-106 may generate one or more such feature vectors in this manner.

In a first training iteration, the computing devices 102-106 may train the respective client models 112-116 with the feature vectors the computing devices 102-106 respectively generated (e.g., the computing device 102 may train the client model 112 with labeled feature vectors the computing device 102 generated). The computing devices 102-106 may train the respective client models 112-116 using backpropagation techniques, adjusting the weights and/or parameters of the client models 112-116 with each feature vector used during the first training iteration. In some embodiments, the computing devices 102-106 may train the respective client models only with the feature vectors the individual computing devices 102-106 generated. The computing devices 102-106 may do so without sharing or transmitting the data or the feature vectors to any of the other computing devices 102-106 or to the federated learning system 108.

In some embodiments, for the first training iteration, the computing devices 102-106 may use sampling to select the data to use to train the client models 112-116. In doing so, the computing devices 102-106 may each sample (e.g., sample from memory of the respective computing device 102-106) the same percentage or number of data points of the available training data. The computing devices 102-106 may train the client models 112-116 with the sampled data. By doing so, the computing devices 102-106 may ensure any single model update transmitted to the federated learning system 108 does not have a disproportionate effect on the training on the global model maintained by the federated learning system 108 (e.g., a computing device that had a significantly more training data available than other computing devices may cause a large change in a particular weight or parameter that is not representative of the performance at the locations of other computing devices. By ensuring each computing device uses the same percentage or number of data points of training, the computing devices may reduce the chances of such disproportionate changes in weights and/or parameters).

Subsequent to training the client models 112-116 in the first training iteration, the computing devices 102-106 may transmit the model updates to the client models 112-116 to the federated learning system 108. The model updates may be the adjustments to the weights and/or parameters of the respective client models 112-116 during the first training iteration. The model updates may be the aggregate adjustments to the weights and/or parameters after the computing devices 102-106 trained the client models 112-116 using each feature vector of the first training iteration. The computing devices 102-106 may identify the features and/or parameters of the client models 112-116. The computing devices 102-106 may compare the identified features and/or parameters to the features and/or parameters of the client models 112-116 when the first training iteration began (e.g., immediately prior to the input of the first feature vector into the respective client model of the first training iteration). The computing devices 102-106 may determine differences between the identified features and/or parameters prior and subsequent to the first training iteration. The computing devices 102-106 may transmit the determined differences to the federated learning system 108 as model updates. The computing devices 102-106 may transmit the model updates to the federated learning system 108 across encrypted communication channels the computing devices 102-106 may have established with the communicator 124. In some cases, the computing devices 102-106 may transmit the determined differences (e.g., the model updates) to the federated learning system 108 with an identifier of the metric that corresponds to the client models being trained.

The model updater 128 may comprise programmable instructions that, upon execution, cause the processor 120 to update the weights and/or parameters of the global model stored in the model database 132. The model updater 128 may retrieve the global model from the model database 132. In some embodiments, the model updater 18 may retrieve the global model from the model database 132 responsive to the global model having a stored association with an identifier of a metric that matches the identifiers of the metrics the federated learning system 108 receives from the computing devices 102-106 with the model updates. The model updater 128 may receive the model updates from the computing devices 102-106 and use the model updates to train the retrieved global model.

The model updater 128 may train the global model using a function on the received model updates. For example, the model updater 128 may calculate an average or median (e.g., a first training value) of the model updates the model updater 128 received for the first training iteration. The model updater 128 may update the retrieved global model with the calculated average or median. Accordingly, the model updater 128 may train the global model based on data from a variety of different sources (e.g., from a variety of different locations). The model updater 128 may train the global model without receiving the training data or placing any sensitive information at risk of being intercepted.

The model updater 128 may synchronize the global model with the client models 112-116. For example, upon updating the global model based on model updates from the first training iteration, the model updater 128 may transmit the updated global model to the computing devices 102-106. The model updater 128 may identify the weights and/or parameters of the updated global model and replace the current weights or parameters of the respective client models 112-116 or replace the current versions of the client models 112-116 with the updated global model. In this way, the model updater 128 may update or synchronize the client models 112-116 with the updated global model after the first training iteration.

After training the client models 112-116 in the first training iteration, the computing devices 102-106 may train the client models 112-116 (e.g., the client models 112-116 updated with the weights and/or parameters of the updated global model and/or replaced by the global model) in a second training iteration. The computing devices 102-106 may train the client models 112-116 by generating and labeling feature vectors from data (e.g., sampled data as described above with respect to the first training iteration) generated from transactions at the respective sites or locations of the computing devices 102-106. The computing devices 102-106 may train the client models 112-116 using the labeled feature vectors in a similar manner to the manner in which the computing devices 102-106 trained the client models 112-116 during the first training iteration.

The model updater 128 may train the global model based on model updates determined from the second training iteration. For example, the computing devices 102-106 may determine model updates for the client models 112-116 based on the training of the client models 112-116 in the second training iteration. The computing devices 102-106 may do so in a similar manner to the manner in which the computing devices 102-106 determined model updates for the first training iteration. The computing device 102-106 may transmit the model updates for the second training iteration to the federated learning system 108. The model updater 128 may receive the model updates, calculate an average or median (e.g., a second training value) from the model updates, and update the global model based on the average or median. The model updater 128 may then transmit the updated global model to the computing devices 102-106. The computing devices 102-106 may update the client models 112-116 based on the weights and/or parameters of the updated global model, as described herein. The model updater 128 and the computing devices 102-106 may similarly train or update the global model and/or the client models 112-116 for any number of training iterations.

In some embodiments, the model updater 128 may train the global model using a smoothing method. The model updater 128 may train the global model using randomized smoothing, for example. Randomized smoothing is a technique that can be used to certify adversarial robustness whereby each prediction is accompanied by a radius in which the classifier's prediction is guaranteed to remain constant. Randomized smoothing certifies that a classification cannot be too sensitive to one particular aspect of a test point. This is achieved by convolving (e.g., smoothing) the input with noise. There are different ways to do the convolution. One way involves the use of Gaussian noise with data augmentation. Training the global model may involve using a combination of Gaussian data augmentation and then training the smoothed global model for scalability and higher robustness. A description of such smoothing is described in "Randomized Smoothing of All Shapes and Sizes," by Greg Yang, et al., published May 6, 2020, and "Lecture 14: Certified Defenses III: Randomized Smoothing," by Jerry Li, et al., published Nov. 13, 2019, the entirety of each of which is incorporated by reference herein.

The anomaly detector 130 may comprise programmable instructions that, upon execution, cause the processor 120 to analyze the training of the client models 112-116 for anomaly detection. For example, the anomaly detector 130 may detect anomalies in the training based on outputs of the global model and the client models based on given data sets. For instance, the anomaly detector 130 may store a first data set that includes transaction data for one or more transactions. The transaction data of the first data set may include or be data for simulated transactions (e.g., synthetic transaction data) or actual transactions. The anomaly detector 130 may transmit the first data set to the computing devices 102-106. The anomaly detector 130 may input the first data set into the global model and execute the global model to generate a first output for the global model. The anomaly detector 130 may do so before or after updating the global model with the model updates received from the computing devices 102-106 for the first training iteration. The computing devices 102-106 may respectively input the first data set into the client models 112-116 and execute the client models 112-116 to generate first outputs for the client models 112-116. The computing devices 102-106 may do so subsequent to training the client models 112-116 in the first training iteration. The computing devices 102-106 may transmit the first outputs for the client models 112-116 to the federated learning system 108.

The anomaly detector 130 may determine first predictive score ratios for the computing devices 102-106. The anomaly detector 130 may determine first predictive score ratios for the computing devices 102-106 based on the first outputs of the client models 112-116 and the first output of the global model. For example, the anomaly detector 130 may compare the first output of the global model with each of the first outputs of the client models 112-116. Based on the comparison, the anomaly detector 130 may determine the first predictive score ratios for the computing devices 102-106 as the ratios of the first output of the global model with the first output of the client models 112-116 maintained by the respective computing devices 102-106. The anomaly detector 130 may determine first predictive score ratios in this manner for any number of computing devices.

The anomaly detector 130 may identify clusters of computing devices based on the first predictive score ratios. For example, the anomaly detector 130 may compare the first predictive score ratios for the computing devices 102-106 with each other. The anomaly detector 130 may determine differences between the first predictive score ratios based on the comparisons. The anomaly detector 130 may identify differences that are lower than a threshold (e.g., a cluster threshold). The anomaly detector 130 may determine computing devices 102-106 that correspond to differences lower than the threshold to be a match and/or to be within a cluster. Each computing device of such a cluster may have a first predictive score ratio within the threshold of each other, at least one of the computing devices of the cluster, or an average of the predictive score ratios of the cluster. In some embodiments, the anomaly detector 130 may determine clusters of computing devices in which each computing device of a cluster corresponds to a range (e.g., a defined range) of first predictive score ratios. In some embodiments, the anomaly detector 130 determines clusters of computing devices using hierarchical clustering by dividing the computing devices into partitions based on the cosine similarity of the gradients of the first predictive score ratios. The anomaly detector 130 may determine such clusters of computing devices in any manner, such as by using other clustering techniques (e.g., k-means clustering). The anomaly detector 130 may label the individual computing devices (e.g., assign values to identifications of the respective computing devices in memory) according to the clusters to which the anomaly detector 130 assigned the computing devices.

The anomaly detector 130 may determine second predictive score ratios for the computing devices 102-106. The anomaly detector 130 may determine the second predictive score ratios based on the second training iteration. For example, the anomaly detector 130 may retrieve a second data set from memory. The second data set may include similar data for transactions to the first data set. The anomaly detector 130 may execute the global model using the second data set as input to generate a second output for the global model. The anomaly detector 130 may transmit the second data set to the computing devices 102-106. Subsequent to training the client models 112-116 in the second training iteration, the computing devices 102-106 may execute the client models 112-116 using the second data set as input to generate second outputs for the client models 112-116. The computing devices 102-106 may transmit the second outputs for the client models 112-116 to the federated learning system 108. The federated learning system 108 may compare the second outputs of the client models 112-116 to the second output of the global model to determine second predictive score ratios for the computing devices 102-106 that correspond to the client models 112-116, as described herein.

The anomaly detector 130 may detect anomalies in computing devices of a cluster. For example, the anomaly detector 130 may identify the second predictive score ratios for the computing devices of a cluster of computing devices (e.g., computing devices assigned to the same cluster based on the differences between the first predictive score ratios of the computing devices of the cluster). The anomaly detector 130 may compare the second predictive score ratios for the computing devices of the cluster with the other second predictive score ratios of the cluster. In some embodiments, the anomaly detector 130 may do so by calculating an average of the second predictive score ratios of the cluster and comparing the individual second predictive score ratios with the calculated average. In some embodiments, for each computing device, the anomaly detector 130 may calculate an average or median of the second predictive score ratios of the other computing devices of the cluster. The anomaly detector 130 may compare the second predictive score ratio for the computing device to the average or median of the other second predictive score ratios of the cluster. Based on such comparisons, the anomaly detector 130 may determine differences for the respective computing devices of the cluster (e.g., a difference between the second predictive score ratio and the value to which the anomaly detector 130 compares the second predictive score ratio). The anomaly detector 130 may compare the differences to a threshold (e.g., a difference threshold). Responsive to determining the difference for a computing device exceeds the threshold, the anomaly detector 130 may detect an anomaly in the computing device. The anomaly detector 130 may determine any computing devices that do not correspond to a difference exceeding the threshold are not experiencing an anomaly.

In some embodiments, responsive to determining the difference for a computing device exceeds the threshold, the anomaly detector 130 may detect a potential anomaly in the computing device. The anomaly detector 130 may store a flag in memory indicating the computing device may correspond to a potential anomaly (e.g., is at high risk of an attack or of having experienced an attack). The flag for the potential anomaly may indicate that the computing device may have been the subject of an attack during training (e.g., during the first training iteration or the second training iteration).

Responsive to storing the flag in memory for the computing device, the anomaly detector 130 may determine whether the computing device is experiencing an anomaly (e.g., an actual anomaly, such as a poisonous attack during training). To do so, the anomaly detector 130 may identify the first predictive score ratio for the computing device and the second predictive score ratio for the computing device. The anomaly detector 130 can compare the two predictive score ratios for the computing device to determine a variation (e.g., a difference) in the two predictive score ratios. The anomaly detector 130 may compare the variation between the first predictive score ratio and the second predictive score ratio to a threshold (e.g., a variation threshold). Responsive to determining the variation exceeds the threshold, the anomaly detector 130 may detect an anomaly in the computing device. However, responsive to determining the variation is less than the threshold, the anomaly detector 130 may identify the computing device as a medium risk (e.g., store a flag in memory indicating the computing device is a medium risk).

In some embodiments, in addition to or instead of detecting anomalies using clustering techniques, the anomaly detector 130 may detect anomalies in computing devices based on the training data the computing devices used to train the client models the computing devices maintain. For example, the computing devices 102-106 may transmit, to the federated learning system 108, the labels for the training data the computing devices 102-106 used to train the client models 112-116 in the first training iteration and the second training iteration. In some embodiments, instead of or in addition to transmitting the labels for the training data, the computing devices 102-106 may transmit the predicted labels that the respective client models 112-116 generated based on the training data sets to the federated learning system 108. For each computing device 102-106, the anomaly detector 130 may calculate one or more first homogeneity scores for labels for the training data of the computing device for the first training iteration (e.g., the actual labels of the training data or the labels the client models generated based on the training data) and one or more second homogeneity scores for labels for the training data of the computing device for the second training iteration.

The anomaly detector 130 may calculate the first homogeneity scores by maintaining counters for each of a plurality of class labels for the training data set for the first training iteration at the computing device. The anomaly detector 130 may increment the counters for each label for the training data set (e.g., each label of the training data set or each label the client model predicted based on the training data set) the anomaly detector 130 identifies that corresponds to the respective counter. The anomaly detector 130 may calculate the first homogeneity scores for each label as a percentage distribution of the label compared to the other labels for the training data set. The anomaly detector 130 may similarly calculate second homogeneity scores for class labels for the training data of the second training iteration. The anomaly detector 130 may similarly calculate first and second homogeneity scores for class labels for any number of computing devices.

In some embodiments, instead of or in addition to calculating homogeneity scores for individual class labels, the anomaly detector 130 may calculate homogeneity scores for the data sets as a whole. For example, the anomaly detector 130 may calculate the frequencies of the individual labels for the training data set of a computing device for the first training iteration. The anomaly detector 130 may organize the frequencies into different buckets (e.g., quartiles or quintiles) based on the size of the frequencies. The anomaly detector 130 may calculate the average of each frequency and the average of the frequencies of defined one or more buckets (e.g., the lowest quartile). The anomaly detector 130 may divide the average of the defined one or more buckets by the average of each frequency. The result of the calculated average may be the homogeneity score for the training data set of the first training iteration for the computing device. The anomaly detector 130 may use any such function to determine homogeneity scores for training data sets. The anomaly detector 130 may determine such homogeneity scores for training data sets of the first training iteration and the second training iteration.

The anomaly detector 130 may compare the first and second homogeneity scores for a computing device (e.g., homogeneity scores for corresponding class labels or for the entire data sets). The anomaly detector 130 may determine variations between the homogeneity scores based on the comparison. The anomaly detector 130 may compare the variations in homogeneity scores to a threshold (e.g., a homogeneity threshold, such as 5%). Responsive to determining a variation for a computing device is less than the threshold, the anomaly detector 130 may determine the computing device is experiencing an anomaly or otherwise detect an anomaly in the computing device. Responsive to determining the variation or each of the variations exceeds the threshold, the anomaly detector 130 may determine the computing device is not experiencing an anomaly. Responsive to determining a variation exceeds one threshold (e.g., 2%) but is less than another threshold (e.g., 5%), the anomaly detector 130 may determine the computing device associated with the variation is a medium risk computing device.

The anomaly detector 130 may detect an anomaly in a computing device based on the differences in frequencies of the class labels between the training data sets. For example, the anomaly detector 130 may calculate frequencies of class labels for training data sets used to train a client model of a computing device in the first training iteration and the second training iteration. The anomaly detector 130 may compare the frequencies of class labels between each other for a training data set to determine a percentage distribution for the frequency of each class label of the training data set. The anomaly detector 130 may compare the percentage distributions for a class label between training data sets (e.g., training data sets of the first and second training iterations for a computing device). The anomaly detector 130 may determine differences for each class label. The anomaly detector 130 may compare the differences to a frequency threshold. Responsive to determining at least one of the differences exceeds the frequency threshold, the anomaly detector 130 may determine the computing device associated with the difference (e.g., the computing device that maintains and trains a client model with the training data sets that correspond to the difference) is experiencing an anomaly and/or detect an anomaly (e.g., a poisoning attack) in the computing device. The anomaly detector 130 may assign a flag to the computing device indicating the determination as to whether the computing device is experiencing an anomaly, is a medium risk computing device, or is not experiencing an anomaly. If the anomaly detector 130 determines a computing device is a medium risk upon multiple times in a row and/or using both the clustering method and the homogeneity score method described herein, the anomaly detector 130 may determine the computing device has been compromised and update the flag of the computing device to an anomalous computing device flag.

In some embodiments, the anomaly detector 130 may only detect anomalies in a computing device responsive to detecting an anomaly in the computing device using both the clustering method and the label frequency analysis methods described above. For example, the anomaly detector 130 may identify any flags that the anomaly detector 130 generated for computing devices under each method. Based on the identification of the flags, the anomaly detector 130 may determine whether the anomaly detector 130 detected an anomaly under both methods for any single computing device. Responsive to determining a computing device was flagged as anomalous under each method, the anomaly detector 130 may detect an anomaly in the computing device or determine the computing device is experiencing an anomaly.

The model updater 128 may discard model updates the model updater 128 receives from computing devices for which the anomaly detector 130 determines are experiencing an anomaly. In some embodiments, the model updater 128 may discard a model update by removing the model update from memory. In some embodiments, the model updater 128 may discard a model update by not using the model update to train the global model. For example, the model updater 128 may train the global model based on model updates the model updater 128 receives from the computing devices 102-106 for the first training iteration. The anomaly detector 130 may detect an anomaly in the computing device 102 based on the data from the first training iteration and the second training iteration, as described herein. Based on the detection of the anomaly in the computing device 102, the model updater 128 may train the global model with the model updates from the computing devices 104 and 106 and not the computing device 102. Accordingly, the model updater 128 may avoid training the global model with improperly weighted training data, preventing hacking of the training.

Figure 2A:
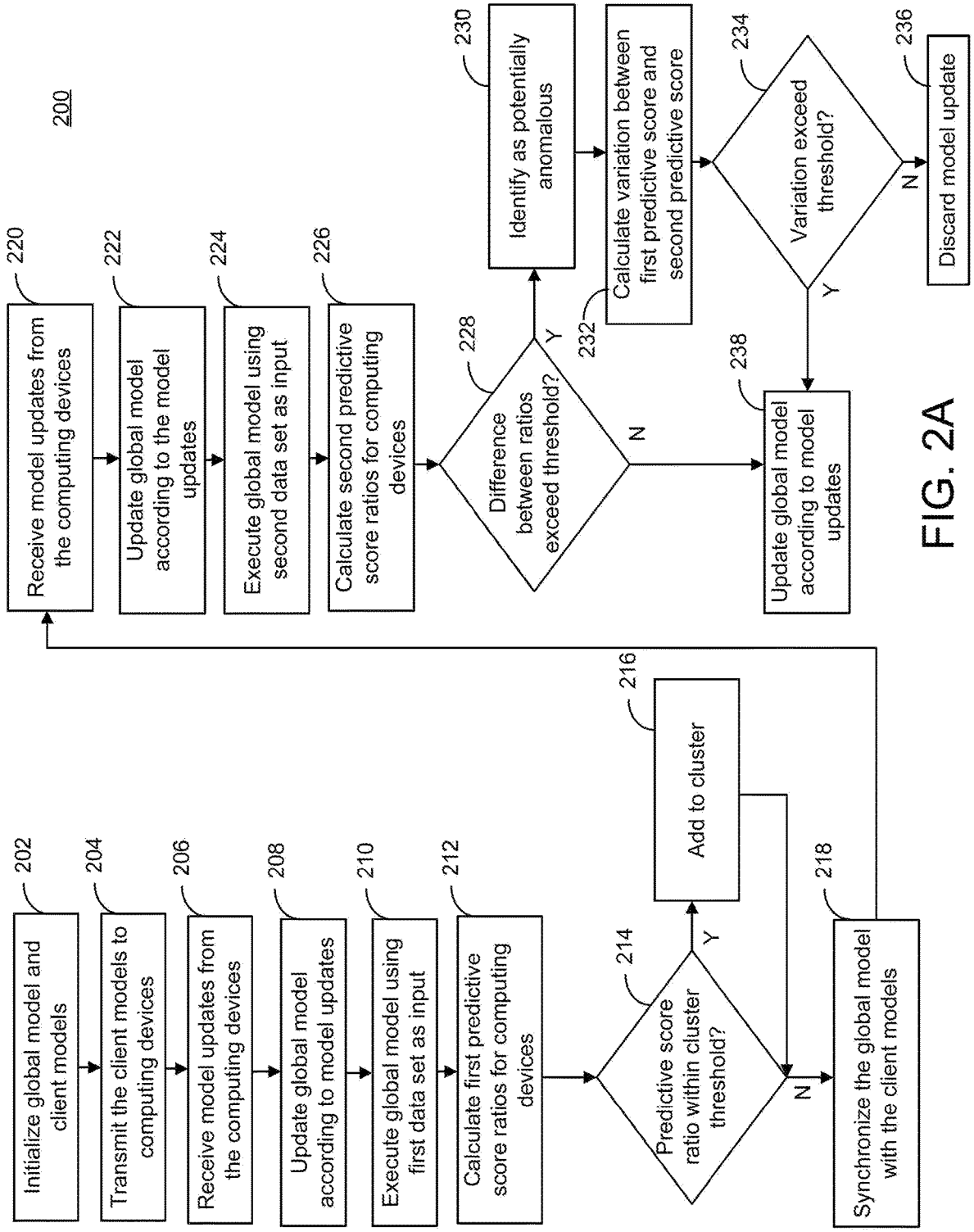
FIGS. 2A and 2B are illustrations of example methods for detecting adversarial attacks and anomalous model training, in accordance with an implementation.
Figure 2B:
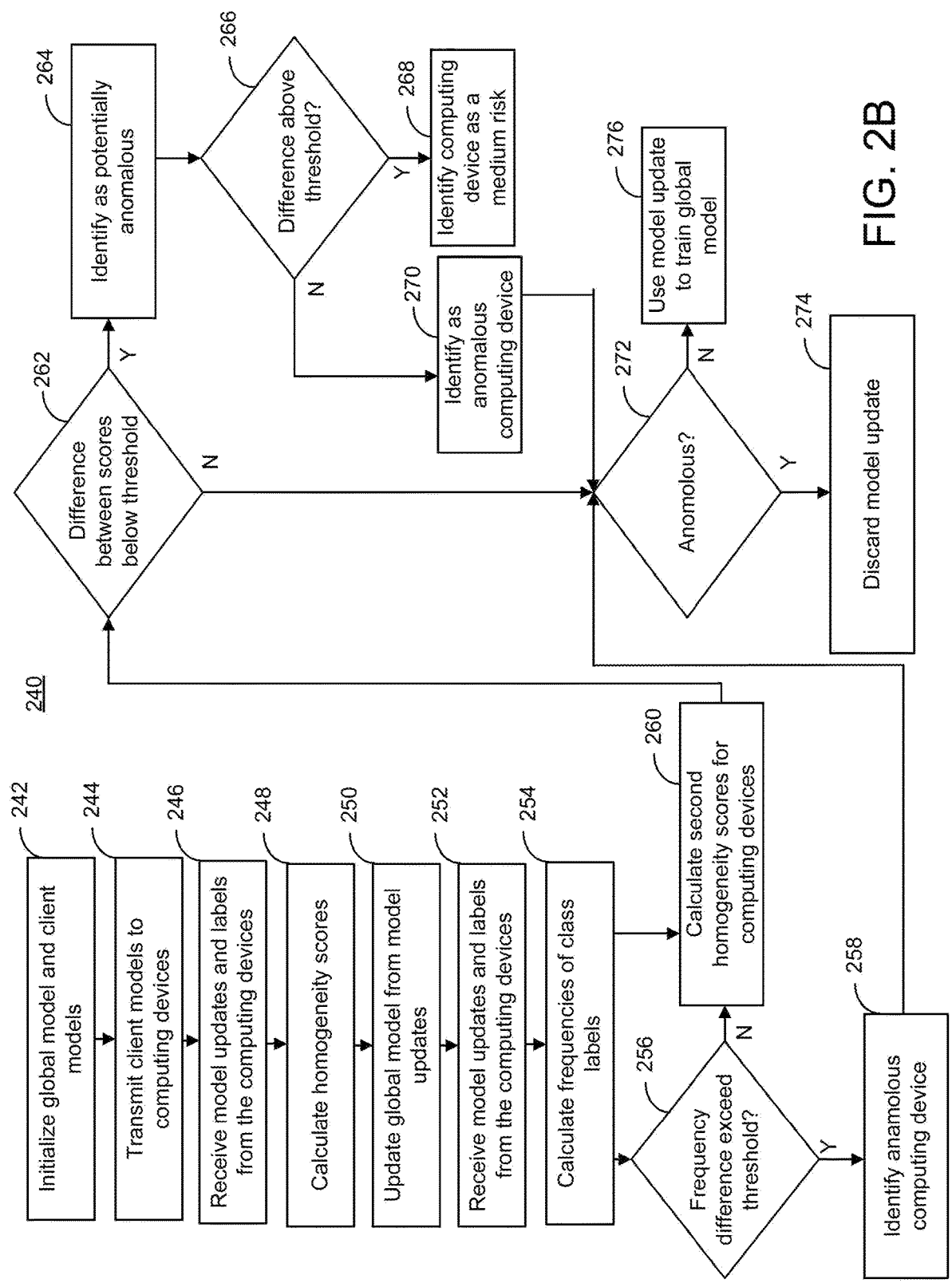

FIGS. 2A and 2B are illustrations of example methods 200 and 240 for detecting anomalous model training, in accordance with an implementation. The methods 200 and 240 can be performed by a data processing system (e.g., a client device or the federated learning system 108, shown and described with reference to FIG. 1, a server system, etc.). The methods 200 and 240 may include more or fewer operations and the operations may be performed in any order. Performance of the methods 200 and 240 may enable the data processing system to train a global model of a federated learning system while protecting the model from malicious actors attempting to improperly influence the training. The data processing system may perform the method 200 using clustering techniques and identifying outliers of previously clustered computing devices. The data processing system may perform the method 240 by comparing the frequencies of class labels between training data sets that are used to train the same client model of a computing device. The data processing system may detect anomalies in computing devices using one or both of the methods 200 and 240. The data processing system may avoid training a global model with model updates the data processing system received from any computing devices experiencing an anomaly. Accordingly, the data processing system may avoid backdoor attacks in which hackers attempt to influence the training of the global model maintained by the data system by improperly weighting the training of a client model that is a part of the federated learning system.

In the method 200, at operation 202, the data processing system initializes a global model and client models. The global model and the client models may each be machine learning models configured to output a metric relating to transactions performed by different individuals. The global model and the client models may do so based on the transaction data. The data processing system may initialize the global model by setting the weights and/or parameters of the global model. The data processing system may initialize the global model using defined weights and/or parameters (e.g., defined weights and/or parameters specific to the metric). The data processing system may initialize the client models by setting the weights and/or parameters of the client models equal to the weights and/or parameters of the global model.

At operation 204, the data processing system transmits the client models to computing devices. The computing devices may be computing devices located at or that store data for locations or sites of different financial institutions and/or brick-and-mortar stores. The data processing system may transmit a different client model to each of the client devices. The data processing system may transmit the client models to the computing devices in binary files in data packets.

At operation 206, the data processing system receives model updates from the computing devices. The model updates may be updates to the weights and/or parameters of the client models. Such updates may be generated in a first training iteration in which each of the computing devices train the client models the computing devices respectively store. The computing devices may train the client models using data sets generated at the locations or sites of the financial institutions and/or the brick-and-mortar stores. The computing devices may train the client models using the respective data sets and calculate a difference in the weights and/or parameters before and after the training. The computing devices may transmit the differences in the weights and/or parameters to the data processing system as model updates.

At operation 208, the data processing system updates the global model. The data processing system may update the global model based on the model updates the data processing system received from the computing devices. The data processing system may calculate an average or a median of the model updates to calculate a global model update. The data processing system may adjust the global model according to (e.g., by aggregating) the global model update with the current weights and/or parameters of the global model.

At operation 210, the data processing system executes the global model. The data processing system may execute the global model using a first data set as input. The first data set may include actual or synthetic transaction data for any number of transactions. The global model may output a first output for the global model based on the execution. The first output for the global model may be a value or score for a metric.

At operation 212, the data processing system calculates first predictive score ratios for the computing devices. The data processing system may transmit the first data set to the computing devices. The computing devices may insert the first data set into the client models stored at the respective computing devices. The computing devices may execute the respectively stored client models. Based on the executions, the client models may output first outputs for the client models. The first outputs for the client models may be values or scores for the same metric as the value for the metric of the first output for the global model. The data processing system may compare the first outputs of the client models to the first output of the global model to generate first predictive score ratios for the computing devices that maintain the respective client models.

At operation 214, the data processing system determines whether the first predictive score ratios are within a cluster threshold of each other. The data processing system may compare the first predictive score ratios with each other to determine differences between the respective first predictive score ratios. The data processing system may compare the differences to a cluster threshold (e.g., defined value). The data processing system may identify pairs (e.g., potentially overlapping pairs) of predictive score ratios that correspond to the different computing devices and that are within the cluster threshold of each other (e.g., that match). In some embodiments, the data processing system may use a clustering algorithm, such as k-means, affinity propagation, agglomerative clustering, balanced iterative reducing clustering using hierarchies, mean shift, optics, etc., to organize the computing devices into clusters based on the first predictive score ratios for the computing devices.

At operation 216, the data processing system adds the computing devices to the clusters based on whether the first predictive score ratios of the computing devices are within a threshold of a computing device or the computing devices of a cluster or based on the clustering algorithm. The data processing system may add the computing devices to the clusters by assigning identifiers to the identifications of the computing devices that identify the clusters to which the computing devices are assigned. The data processing system may store associations between the identifications of the computing devices and identifiers of the clusters to which the data processing system assigned the computing devices in memory.

At operation 218, the data processing system synchronizes the global model with the client models. The data processing system may synchronize the global model with the client model after updating the global model according to the model updates the data processing system receives for the first training iteration of the client models. The data processing system may synchronize the global model with the client models by transmitting the global model and/or the weights and/or parameters of the global model to the computing devices. The computing devices may receive the global model and/or the weights and/or parameters of the global model. The computing devices may update the client models the computing devices store to include the weights and/or parameters of the global model or replace the files the computing devices store for the client models with the file that includes the global model. Accordingly, each of the client models may be trained based on training data generated at the sites or locations of other computing devices without sharing any sensitive data with each other.

At operation 220, the data processing system receives model updates from the computing devices. The data processing system may receive the model updates after the computing devices train the client models that the computing devices maintain in a second training iteration. The model updates may be or include changes in weights and/or parameters of the respective client models that result from the second training iteration.

At operation 222, the data processing system updates the global model according to the model updates. The data processing system may do so by calculating a global model update (e.g., a second global model update) based on the model updates. The data processing system may execute a function, such as an average or a median, from the model updates to calculate the global model update. The data processing system may adjust the weights and/or parameters of the global model according to the global model update (e.g., by aggregating the global model update with the current weights and/or parameters of the global model).

At operation 224, the data processing system executes the global model using a second data set as input. The data processing system may retrieve the second data set from memory and insert the second data set into the global model. The data processing system may execute the global model based on the second data set to generate a second output for the global model. The second output may be or include a value or score for the same metric as the value or score for the first output.

At operation 226, the data processing system calculates second predictive score ratios for the computing devices. To do so, the data processing system may transmit the second data set to the computing devices. The computing devices may input the second data set into the client models that the computing devices respectively maintain. The computing devices may execute the client models. Based on the execution, each client model may generate a second output for the client model. The second output for the client models may be values or scores for the same metric as the value or score of the global model. The data processing system may compare the second outputs for the client models with the second output of the global model to calculate second predictive score ratios for the computing devices.

At operation 228, the data processing system determines whether differences between second predictive score ratios exceed a threshold (e.g., a difference threshold). The data processing system may identify the second predictive score ratios for the computing devices of a single cluster. The data processing system may compare the second predictive score ratios for the computing devices of the cluster. The data processing system may identify any outliers based on the comparison. For example, the data processing system may identify an outlier computing device of the cluster by determining an average or median of the second predictive score ratios of the cluster and determining a second predictive score ratio for a computing device exceeds the average or median by an amount above a threshold. In another example, the data processing system may detect an outlier by determining the second predictive score ratio of one computing device exceeds the second predictive score ratio of one or more other computing devices within the cluster by an amount above a threshold. The data processing system may only compare the second predictive score ratios of computing devices with second predictive score ratios of other computing devices within the same cluster. The data processing system may determine outliers in this way for any number of clusters of computing devices.

At operation 230, the data processing system identifies the computing devices that the data processing system identified as an outlier of a cluster as potentially anomalous. Potentially anomalous may mean that the computing devices are at high risk of an attack or of already being attacked. In some embodiments, the data processing system may determine such computing devices are anomalous based on the outlier identification alone. The data processing system may store associations between the computing devices identified as anomalous or potentially anomalous and flags identifying identifications of the respective computing devices in memory.

At operation 232, the data processing system calculates variations between predictive score ratios. The data processing system may only calculate variations of computing devices the data processing system identified as potentially anomalous at operation 228. The data processing system may calculate a variation for a computing device by comparing the first predictive score ratio for the computing device with the second predictive score ratio of the computing device. The variation may be the difference between the two predictive score ratios. The data processing system may similarly calculate variations for each of the computing devices the data processing system identified as potentially anomalous.

At operation 234, the data processing system may determine whether the calculated variations exceed a threshold (e.g., a variation threshold). The data processing system may compare the variations to the threshold. Responsive to determining a variation for a computing device exceeds the threshold, at operation 236, the data processing system discards (e.g., removes from memory or otherwise disregards) the model update the computing device transmitted the data processing system for the second training iteration. The data processing system may discard any model update for the second training iteration that the data processing system received from a computing device that corresponds to a variation above the threshold.

At operation 238, the data processing system updates the global model. The data processing system may update the global model using the model updates the data processing system receives for the second training iteration. The data processing system may only update the global model using model updates from computing devices for which the data processing system determined are not experiencing an anomaly or that are not at high risk. The data processing system may identify model updates from the non-anomalous computing devices and calculate a global model update from the model updates (e.g., calculate the global model update using an averaging or a median function). The data processing system may update the global model using the global model update such as by aggregating the weights and/or parameters of the global model update with the current weights and/or parameters of the global model. The data processing system may then synchronize the updated global model with the client models by transmitting the updated global model to the computing devices, as described herein.

The data processing system may perform the method 240 instead of or concurrently with the method 200. In the method 240, at operation 242, the data processing system initializes a global model and client models. At operation 244, the data processing system transmits the client models to computing devices. The data processing system may perform the operations 242 and 244 in a similar manner to the manner in which the data processing system performs the operations 202 and 204. In some embodiments, the operations 242 and 244 are the same as operations 202 and 204.

At operation 246, the data processing system receives model updates and labels from the computing devices. The data processing system may receive the model updates and labels subsequent to the computing devices training the respective client models in a first training iteration (e.g., the first training iteration of the operation 206) as described with reference to the operation 206. The model updates may be the changes in the weights or labels of the client models based on the first training iteration. The labels may be the labels of the training data with which the computing devices trained the client models in the first training iteration or the labels the client model predicted in the first training iteration.

The data processing system may calculate frequencies of the class labels for the individual computing devices. The data processing system may do so by maintaining and incrementing counters for the different class labels. The data processing system may maintain a counter for each class label received from a single computing device. The data processing system may increment a counter for each instance of the class label that the data processing system detects for the computing device. The data processing system may similarly maintain and increment any number of counters for a computing device and for any number of computing devices.

In some embodiments, the data processing system may determine the labels (e.g., a frequency of the labels) for the different computing devices. The data processing system may do so based on the model updates the data processing system receives from the computing devices. For example, the data processing system may store a table indicating values for frequencies of different labels. The table may include relationships between the values and changes or adjustments to various weights and/or parameters within the global model. The data processing system may compare the individual model updates to the table to identify frequencies of the labels for the first training iteration for the individual computing devices. In another example, the processing system may determine the frequencies of the labels using a function (e.g., multiply particular weights and/or parameters by defined factors, which may be specific to the weights, parameters, and/or labels). The data processing system may receive the model updates and apply the function to the respective model updates to determine frequencies for the labels.

At operation 248, the data processing system calculates homogeneity scores. The data processing system may calculate homogeneity scores for the computing devices based on the labels the data processing system determines or receives from the computing devices for the first training iteration. The data processing system may calculate the homogeneity scores based on the frequencies of the labels of the first training iteration. In one example, the data processing system may calculate a homogeneity score for each of the labels as the percentage distribution of the label compared to the other labels of the first training data set. In another example, the data processing system may calculate a single homogeneity score for each computing device by applying a function to the frequencies of the labels, such as calculating the average of all the frequencies and dividing an average of a quartile of the frequencies by the average of all of the frequencies. The data processing system may calculate the homogeneity scores in any manner.

At operation 250, the data processing system updates the global model from the model updates. The data processing system may update the global model from the model updates as described herein and transmit the weights and/or parameters or the updated global to the computing devices to synchronize the updated global model with the client models stored by the computing devices.

At operation 252, the data processing system receives model updates and labels for a second training iteration (e.g., the second training iteration described with reference to the operation 220) from the computing devices. The data processing system may receive the model updates and labels after the computing devices train the client models that the computing devices maintain in the second training iteration. The model updates may be or include changes in weights and/or parameters of the respective client models that result from the second training iteration. The labels may be or include the label for the training data sets of the second training iterations or the output prediction labels of the clients based on the training data sets of the second training iteration.

At operation 254, the data processing system calculates frequencies of the class labels. The data processing system may calculate the frequencies of the class labels for the second iteration using similar techniques to those described with reference to the operation 246.

At operation 256, the data processing system determines whether a frequency difference for a computing device exceeds a threshold (e.g., a frequency threshold). The data processing system may compare the frequencies of the class labels for the second training iteration or the first training iteration with each other. In doing so, the data processing system may determine differences between the frequencies of the same training iterations (e.g., the data processing system may only compare frequencies of class labels between each other for the same training iteration). The data processing system may compare the differences to the threshold. Responsive to determining a difference exceeds the threshold, at operation 258, the data processing system may identify the computing device that corresponds to the difference (e.g., the computing device that maintains the client model that was trained with the training data that caused the difference) as an anomalous or potentially anomalous computing device.

In some embodiments, the data processing system may compare the differences of the second training iteration with differences of the first training iteration to determine variations in differences for the individual class labels. For example, the data processing system may compare differences in frequencies between one or more labels of the second training iteration to differences in frequencies between the same one or more labels of the first training iteration. The data processing system may determine training at a computing device is anomalous or potentially anomalous at the operation 258 responsive to determining a variation in the difference in the compared frequencies exceeds a threshold. Upon determining the computing device is anomalous or potentially anomalous, the data processing system may label the computing device in memory with an identification that the computing device is anomalous or potentially anomalous.

At operation 260, the data processing system determines second homogeneity scores for the computing devices. The data processing system may determine the second homogeneity scores based on received data for the second training iteration. The data processing system may determine the second homogeneity scores for individual class labels of the second training iteration or the entire data sets of the second training iteration similar to how the data processing system determined the first homogeneity scores for the first training iteration.

At operation 262, the data processing system determines a difference between a first homogeneity score and a second homogeneity score are below a threshold (e.g., a homogeneity threshold). To do so, the data processing system may compare the first and second homogeneity scores for a computing device to determine differences for the computing device. The data processing system may compare the difference to the threshold. In some embodiments, the data processing system may compare the homogeneity scores of individual class labels for a computing device between training iterations. In such embodiments, the data processing system may compare each of the differences for the class labels to the threshold. The data processing system may similarly determine differences for each computing device that trained a client model for the first and second training iterations.

Responsive to determining a difference in homogeneity scores for a computing device is below the threshold, at operation 264, the data processing system identifies the computing device as potentially anomalous (e.g., detects an anomaly in the computing device). The data processing system may label the computing device with a flag indicating the computing device is potentially anomalous. At operation 266, the data processing system determines whether the difference in homogeneity scores for the computing device is above a second threshold. For example, the data processing system may determine if the difference in homogeneity scores for the computing device is above 2% and below 5%. Responsive to determining the difference is above the second threshold, at operation 268, the data processing system identifies the computing device as medium risk. The data processing system may label the computing device in memory as a medium risk computing device.

However, responsive to determining the difference in homogeneity scores for the computing device is above the threshold, at operation 270, the data processing system identifies the computing device as an anomalous computing device. The data processing system may label the computing device in memory as an anomalous computing device. The data processing system may repeat the operation 246-270 for any number of computing devices to detect anomalous computing devices.

At operation 272, the data processing system may determine which computing devices are anomalous. The data processing system may do so by identifying the flags in memory that correspond to the computing devices and indicate whether the computing devices are anomalous or not. At operation 274, the data processing system may discard (e.g., remove from memory or not use to train the global model) model updates the data processing system receives from computing devices the data processing system determined to be anomalous. At operation 276, the data processing system uses the model updates of the computing devices identified as non-anomalous or otherwise did not identify as anomalous to train the global based on the second training iteration.

In some embodiments, the data processing system may only discard model updates from computing devices that the data processing system determined to be anomalous based on both of the methods 200 and 240. The data processing system may determine a computing device is anomalous based on both methods by identifying flags generated for the computing device under each of the method 200 and 240 in memory. Accordingly, the data processing system may avoid false positives in identifying anomalous computing devices.

Figure 3A:
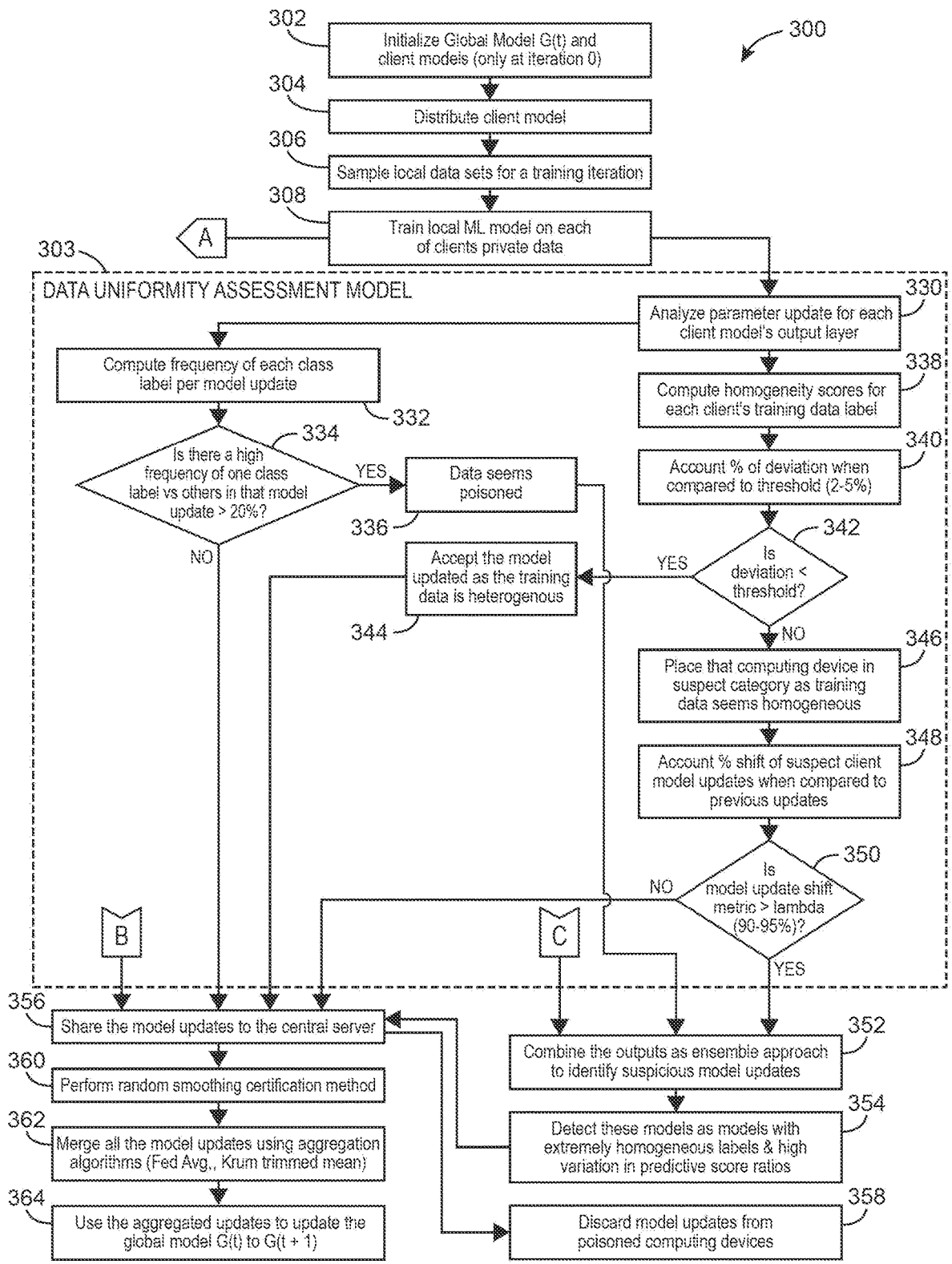
FIGS. 3A and 3B are illustrations of an example method for detecting targeted adversarial attacks and anomalous model training, in accordance with an implementation.
Figure 3B:
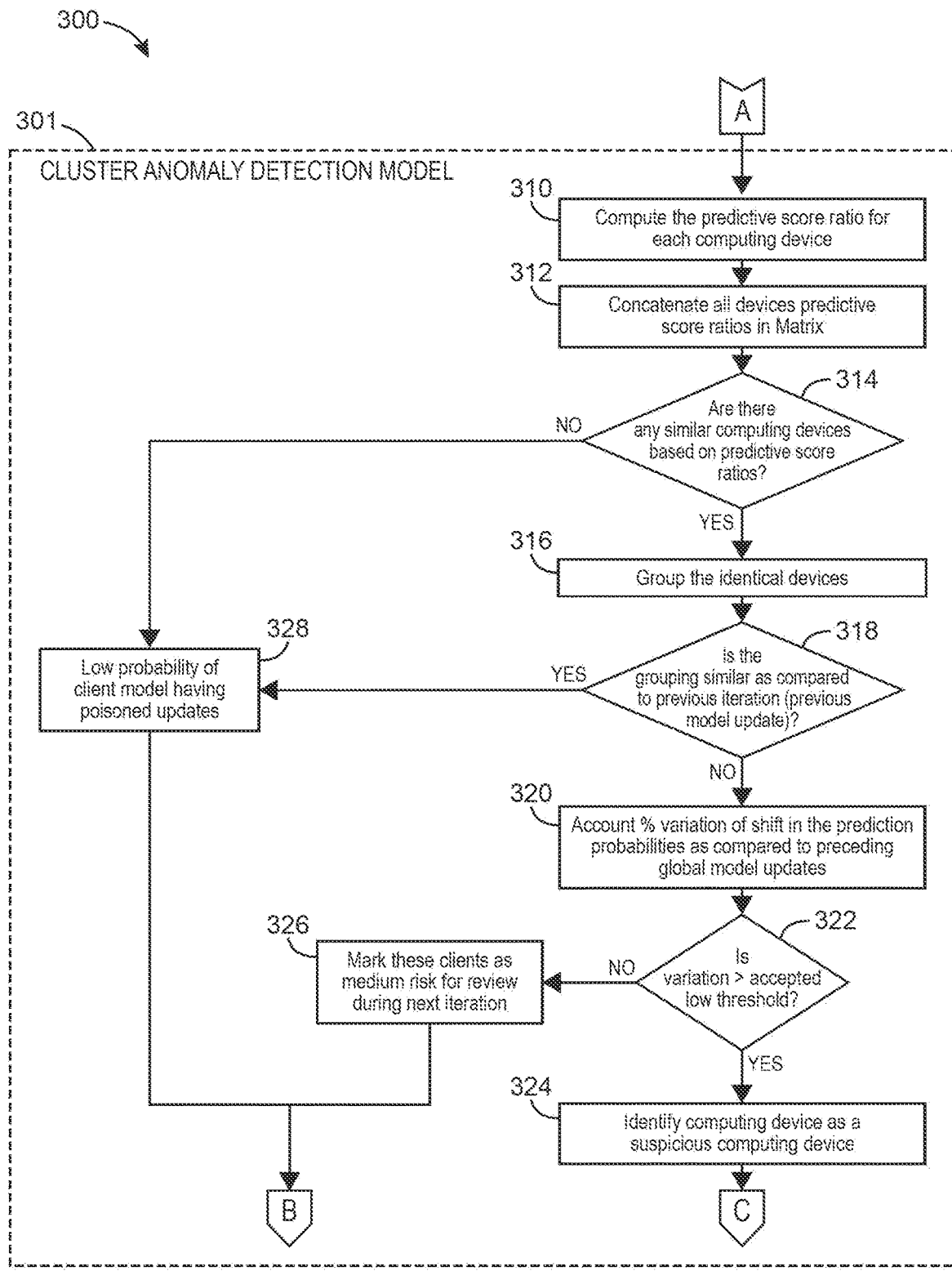

FIGS. 3A and 3B are illustrations of an example method 300 for detecting anomalous model training, in accordance with an implementation. The method 300 can be performed by a data processing system (e.g., a client device or the federated learning system 108, shown and described with reference to FIG. 1, a server system, etc.). The method 300 may include more or fewer operations and the operations may be performed in any order. The method 300 may be similar to or the same as the methods 200 and 240, shown and described with reference to FIGS. 2A and 2B. The method may include operation 302-364. A cluster anomaly detection module 301 may perform operation 310-328 and a data uniformity assessment module 303 may perform operations 330-350. The cluster anomaly detection module 301 and the data uniformity assessment module 303 may be separate components of the anomaly detector 130, shown and described with reference to FIG. 1.

At operation 302, the data processing system initializes a global model G(t) and client models. The data processing system may only initialize the client models prior to a first training iteration. At operation 304, the data processing system distributes the client models to computing devices at various locations or sites. At operation 306, the client devices sample local data sets for a training iteration. The client devices may each sample a set number of data points (e.g., data, such as values or attributes, of individual transactions) or a set percentage of data points. The client devices may do so using the same number or percentage of data points as each other. At operation 308, the client devices trains the client models in a first training iteration. The client devices may do so based on the private data of the respective client devices.

At operation 310, the data processing system computes a first predictive score ratio for each computing device. At operation 312, the data processing system concatenates all of the first predictive score ratios for the computing devices into a matrix or a vector. At operation 314, the data processing system determines whether computing devices are similar to each other based on the first predictive score ratios for the computing devices from the matrix. Responsive to determining at least one computing device is similar to another computing device, at operation 316, the data processing system groups the similar computing devices. The data processing system may group the computing devices into one or more clusters based on the computing devices within each cluster having similar first predictive score ratios. Subsequent to the computing devices training the client models in a second training iteration, at operation 318, the data processing system assesses whether the groupings are similar as compared to the first training iteration. The data processing system may do so for each computing device by calculating a second predictive score ratio for the computing device and comparing the second predictive score ratio with the predictive score ratios of other computing devices within the same cluster as the computing device.

Responsive to determining a computing device has a second predictive score ratio different (e.g., different by a threshold) from the other computing devices of the same cluster as the computing device, at operation 320, the data processing system determines a variation (e.g., a % variation) in the predictive score ratios between the first training iteration and the second training iteration. The data processing system may determine the variation as a value or as a percentage change between the first predictive score ratio and the second predictive score ratio. At operation 322, the data processing system determines whether the variation exceeds a threshold. Responsive to determining the variation exceeds the threshold, at operation 324, the data processing system identifies the computing device as a suspicious client device. However, responsive to determining the variation does not exceed the threshold, at operation 326, the data processing system marks the computing device as a medium risk for review for a subsequent training iteration. Responsive to determining at operation 314 that there are not any similar computing devices or determining at operation 318 that the second predictive score ratios are similar within the clusters, at operation 328, the data processing system determines there is a low probability of a poisoned update from the second training iteration.

For each computing device or client model, at operation 330, the data processing system identifies the output labels of the client models from the first training iteration and/or the second training iteration. At operation 332 the data processing system calculates the frequency of each class label the client model predicted for the first training iteration or the second training iteration. At operation 334, the data processing system determines whether the client model output a particular class label with a frequency having a percent distribution higher than the other class labels by an amount above a threshold (e.g., 20%). Responsive to determining a class label has a frequency above the threshold, at operation 336, the data processing system determines the computing device is a suspicious computing device.

For each computing device or client model executing on the computing device, at operation 338, the data processing system computes a homogeneity score for each class label of the first training iteration and/or the second training iteration. The homogeneity scores can be the percent distribution of the respective class label within the output class labels by the client model. At operation 340, the data processing system determines deviations between homogeneity scores (e.g., homogeneity scores of the same class labels) of the first and second training iterations for each class label. The data processing system may compare the deviations to a threshold. At operation 342, the data processing system determines whether any deviations are less than the threshold. Responsive to determining each deviation is below the threshold, at operation 344, the data processing system determines the computing device was updated on heterogeneous training data and is not a suspicious computing device.

Responsive to determining no deviations are below the threshold, at operation 346, the data processing system identifies the computing device as a suspicious computing device. At operation 348, the data processing system calculates a percentage shift of client model updates when compared to the previous updates. The data processing system may calculate the percentage shift as an overall change in percentage distributions of all of the class labels between the first and second training iterations. The data processing system may do so based on a function of the changes in frequency of the class labels between the first and second training iterations. For example, the data processing system may calculate an overall homogeneity score for a computing device for the first training iteration and the second training iteration. The data processing system may do so, for instance, by grouping the homogeneity scores for a training iteration into different buckets, calculating the average of all of the frequencies, calculating the average of the lowest bucket, and dividing the average for the lowest bucket by the average score. The data processing system may similarly calculate the overall homogeneity scores for each training iteration. The data processing system may compare sequential homogeneity scores (e.g., homogeneity scores for the first and second training iteration for a computing device) to determine variations in the homogeneity scores.

At operation 350, the data processing system determines whether the variation in homogeneity scores for a computing device exceeds a threshold. Responsive to determining the variation exceeds the threshold, the data processing system may identify the computing device as a suspicious computing device.

At operation 352, the data processing system combines the outputs of the cluster anomaly detection module 301 and the data uniformity assessment module 303. The data processing system may do so by retrieving the flags or identifications that the data processing system determined for the different computing devices using the cluster anomaly detection module 301 and the data uniformity assessment module 303. At operation 354, the data processing system identifies any computing device that each of the cluster anomaly detection module 301 and the data uniformity assessment module 303 detected as suspicious or as being anomalous. At operation 356, the computing devices share the client model updates to the data processing system. At operation 358, the data processing system discards the model updates from the poisoned computing devices (e.g., the computing devices for which each of the cluster anomaly detection module 301 and the data uniformity assessment module 303 detected an anomaly or identified as being suspicious).

At operation 360, the data processing system performs a random smoothing certification method on the model updates. Doing so may increase the robustness against input perturbations and transformations. At operation 362, the data processing system merges the model updates using an aggregation algorithm (e.g., federation learning average, Krum trimmed mean, median, etc.). At operation 364, the data processing system uses the aggregated update to update the global model $G(t)$ to $G(t+1)$.

Figure 4:
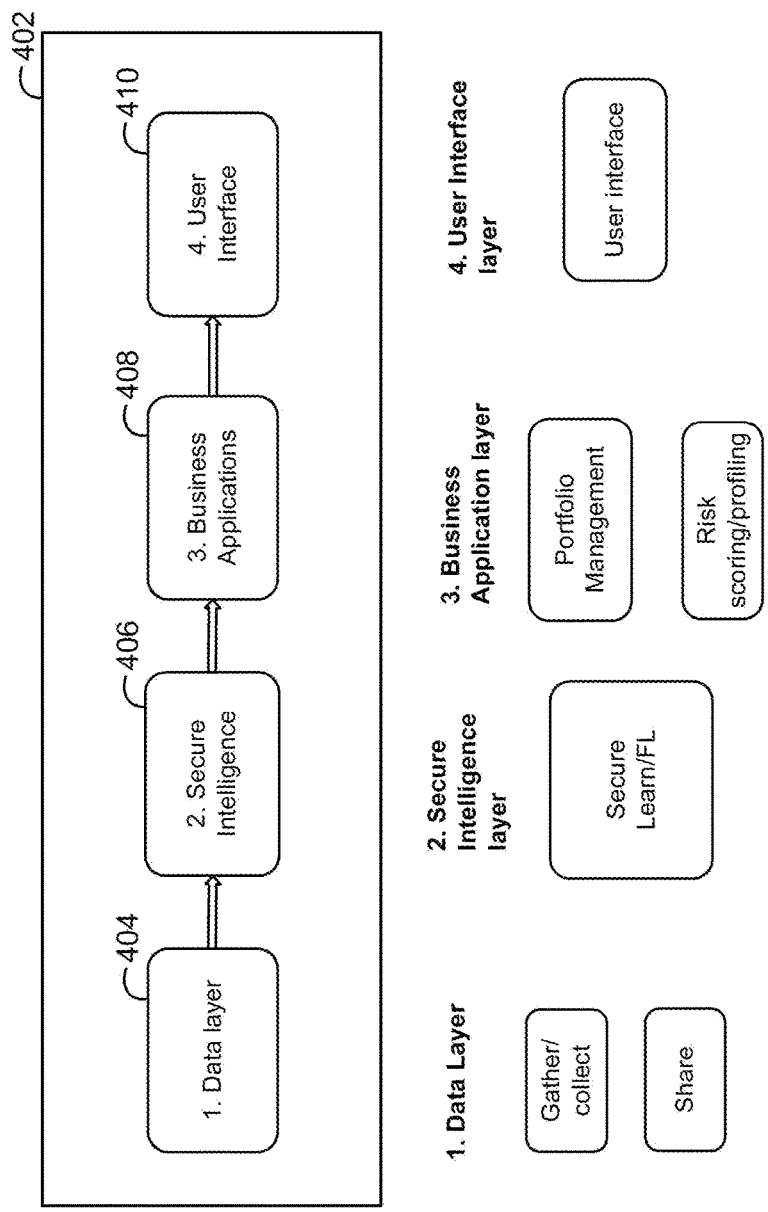
FIG. 4 is an illustration of a sequence for gathering customer data, in accordance with an implementation.

FIG. 4 is an illustration of a sequence 400 for gathering customer data, in accordance with an implementation. The sequence 400 may be performed by different layers of an application 402. The application 402 may be an application maintained and executed by the federated learning system 108, shown and described with reference to FIG. 1. The application 402 may include a data layer 404, a secure intelligence layer 406, a business application layer 408, and a user interface layer 410.

The data layer 404 may facilitate gathering customer data from disparate sources, including internal systems and separate third-party sources. The data layer 404 may include a plurality of databases with data sources concerning customer information, such as taxation info, multiple financial sources such as primary bank accounts, PAYPAL, and investment accounts such as crypto, stock wallets, and credit card information. The data layer 404 may use newly emerging protocols such as open banking to allow access to third-party financial services, consumer banking, deposits, withdrawals, payments, debits, credits, origination of loans, leases, and mortgages, transactional, 401k, IRA, stocks and other financial data from banks and nonbank financial institutions (financial advisors and robot advisers). One component of the data layer 404 is the ability to securely share data on demand should customers request such data. Customers may have control and flexibility to share various layers of aggregates, as opposed to the current practice of sharing in which customers have a choice to share or not without any option on how to do so.

The secure intelligence layer 406 may represent a federation learning-based architecture of the data processing system. The secure intelligence layer 406 may develop client models for each of a plurality of edge devices (e.g., the computing devices 102-106). Each edge device may store or maintain a local machine learning model corresponding to a data source (e.g., a different data source). For example, an edge device A may represent (e.g., store data for and train) a machine learning model created using (e.g., only using) taxation-based features, an edge device B may represent a machine learning model created using reputation-based features, an edge device C may represent a machine learning model created using consumer banking, an edge device D may represent a machine learning model created using mortgage-based features, an edge device E may represent a machine learning model created using investment accounts and transaction-based features. Because the edge devices may correspond to different types of data, the edge devices may each be trained to tune different aspects of the global model maintained by the data processing system during federation learning training, which can speed up the training of the global model. The secure intelligence layer 406 may contain other advanced data aggregation, analysis, and insight engines in addition to or instead of the machine learning models.

The data processing system and the edge devices may operate in a centralized machine learning solution (e.g., in a cloud platform) using a federated learning model architecture. In the centralized machine learning solution, the data processing system may store a global model and the edge devices may each maintain a client model. The edge devices may train the client models the edge devices respectively store in rounds (e.g., training iterations). In each round, the edge devices may minimize a loss function during training of the respective client models. After each round, the edge devices may transmit model updates (e.g., changes in weight and/or parameters of the client models the edge devices respectively maintain) to the data processing system without sharing any telemetry data or data used to train the respective models. The data processing system may aggregate the model updates from each edge device to generate an aggregated model update. The data processing system may train the global model based on the aggregated model update to update the global model. The data processing system may transmit the updated global model to the edge devices. In some embodiments, the edge devices and the data processing system may train the global model and the client models in this manner by exchanging encrypted model weights and bias coefficients back and forth with each other.

Figure 5:
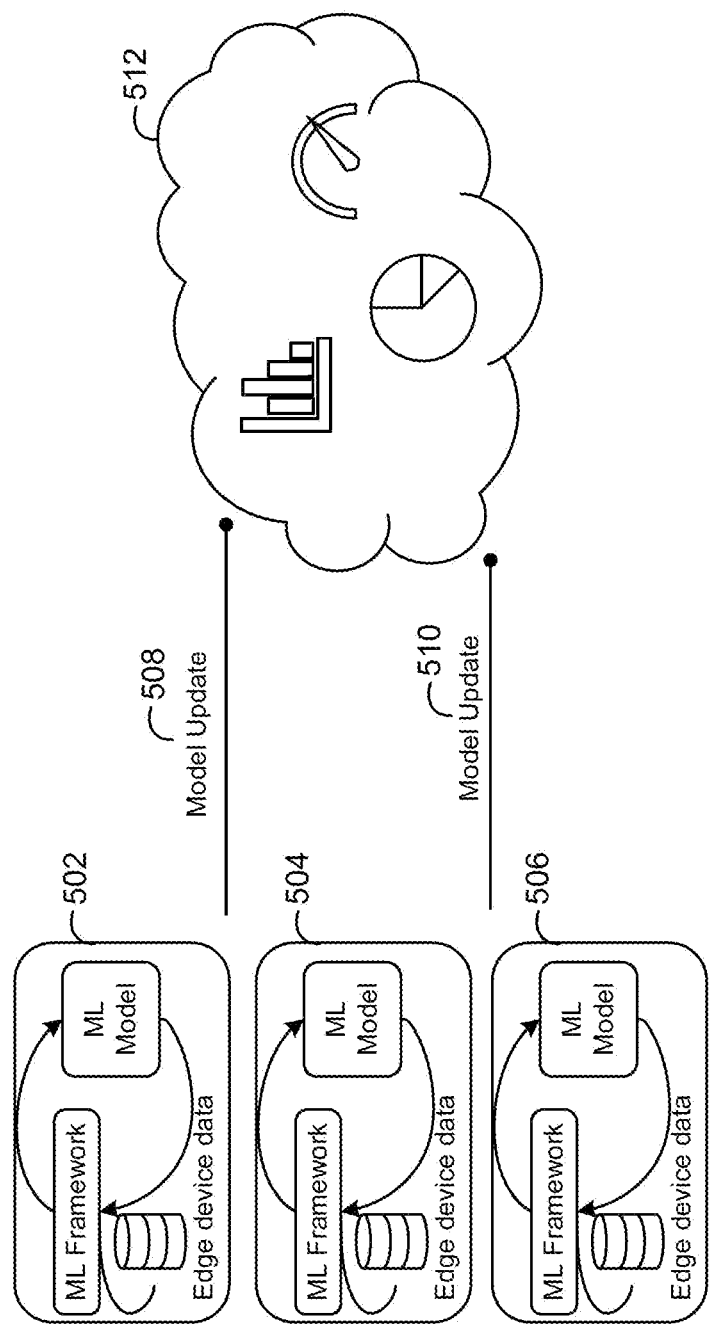
FIG. 5 is an illustration of a federated learning system, in accordance with an implementation.

In one example, a federated learning architecture 500 is illustrated in FIG. 5. In the federated learning architecture 500, edge devices 502-506 may generate model updates 508 and 510 in a training iteration. The edge devices 502-506 may transmit the model updates 508 and 510 to a data processing system 512. The data processing system 512 may receive the model updates 508 and 510 and train a global model maintained by the data processing system 512 using the model updates 508 and 510. The data processing system 512 may input data to the global model to output data analytics, such as data analytics for transactions performed at locations that correspond to the different edge devices 502-506.

The business application layer 408 may execute the global model using different types of data for applications or sub-applications, such as a portfolio management sub-application and/or a risk scoring/profiling application. Each of the applications and/or sub-application may generate different results based on the output of the global model. The edge devices may execute the client models the edge devices respectively store to generate outputs for similar applications to the data processing system. The user interface layer 410 may generate user interfaces for display at client devices based on the outputs of the business application layer 408.

Figure 6:
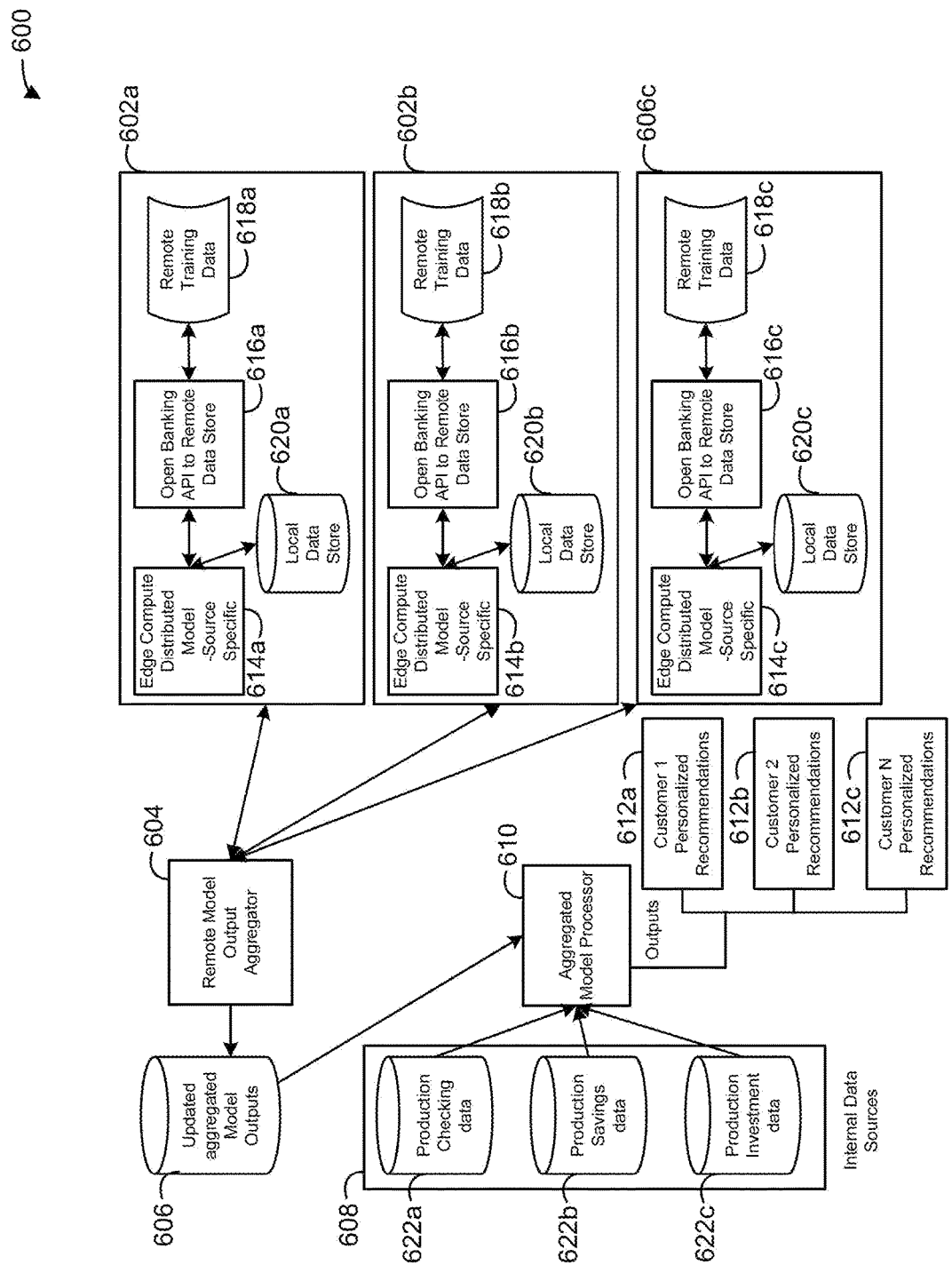
FIG. 6 is an illustration of a federated learning system, in accordance with an implementation.

FIG. 6 is an illustration of a federated learning system 600, in accordance with an implementation. The federated learning system 600 may include computing devices 602a-602c (individually computing device 602 and collectively computing devices 602), a remote model output aggregator 604, an update aggregated model outputs database 606, internal data sources 608, an aggregated model processor 610, and recommendations 612a-612c (individually recommendation 612 and collectively recommendations 612).

The computing devices 602 may respectively store client models 614a-614c, application programming interfaces (APIs) 616a-616c, remote training data 618a-618c, and local data stores 620a-620c. The computing devices 602 may respectively retrieve data from the remote training data 618a-618c with the APIs 616a-c. In some embodiments, the computing devices 602 may not store the remote training data 618a-c. In such embodiments, the computing devices 602 may execute the APIs 616-a-616c to retrieve the remote training data 618a-c from servers storing the remote training data 618a-618c. The computing devices 602 may train the client models 614a-614c with the retrieved data. The computing devices 602 may transmit model updates generated during the training to the remote model output aggregator 604.

The remote model output aggregator 604 may be a service or module of executable instructions stored in a data processing system (e.g., the federated learning system 108). The remote model output aggregator 604 may receive model updates from the computing devices 602 and calculate an aggregated model output from the received model updates using a function (e.g., an averaging function). The remote model output aggregator 604 may store the aggregated model output in the aggregated model outputs database 606 (e.g., a relational database).

The aggregated model processor 610 may be a service or module of executable instructions stored in the data processing system. The aggregated model processor 610 may store and/or execute a global model. The aggregated model processor 610 may train the global model with the aggregated model output from the aggregated model outputs database 606. The aggregated model processor 610 may retrieve data from databases 622a-611c of the internal data sources 608. The aggregated model processor 610 may generate feature vectors from the retrieved data. The aggregated model processor 610 may generate the recommendations based on the feature vectors.

The remote model output aggregator 604 may transmit the updated weights and/or parameters of the global model to the computing devices 602. The computing devices 602 may update the client models 614a-614c based on the updated weights and/or parameters. The computing devices 602 may respectively retrieve data from the local data stores 620a-620c. The computing devices 602 may generate feature vectors from the retrieved data and input the feature vectors into the client models 614a-614c. The client models 614a-c may output recommendations similar to the recommendations 612 based on retrieved data.

At least one aspect of a technical solution to the problems described herein is directed to a method. The method may include transmitting, by a server, a first client model to a first computing device and a second client model to a second computing device, wherein, in a first training iteration, the first computing device trains the first client model and the second computing device trains the second client model; determining, by the server based on the first training iteration, (i) a first predictive score ratio for the first computing device by comparing a first output of the first client model with a first output of a global model, and (ii) a first predictive score ratio for the second computing device by comparing a first output of the second client model with the first output of the global model; determining, by the server, the first computing device and the second computing device match responsive to determining the first predictive score ratio for the first computing device and the first predictive score ratio for the second computing device are within a cluster threshold of each other, wherein, in a second training iteration subsequent to the first training iteration, the first computing device trains the first client model and the second computing device trains the second client model; determining, by the server based on the second training iteration, (i) a second predictive score ratio for the first computing device by comparing a second output of the first client model with a second output of the global model, and (ii) a second predictive score ratio for the second computing device by comparing a second output of the second client model with the second output of the global model; and detecting, by the server, an anomaly in the first computing device responsive to (i) the determining the first computing device and the second computing device match, and (ii) determining the second predictive score ratio for the first computing device exceeds the second predictive score ratio for the second computing device by an amount above a difference threshold.

In some embodiments, the method includes receiving, by the server, a model update generated from the second training iteration at the first computing device; and discarding, by the server, the model update responsive to the identification of the anomaly in the first computing device. In some embodiments, the first computing device and the second computing device are computing devices of a plurality of computing devices, each of the plurality of computing devices storing a client model trained in the first training iteration and the second training iteration. The method may include receiving, by the server, a model update generated from the second training iteration at each computing device of the plurality of computing devices; and updating, by the server, the global model based on each of the model updates generated from the second training iteration except for the model update of the first computing device.

In some embodiments, the first computing device and the second computing device are computing devices of a plurality of computing devices, each of the plurality of computing devices storing a client model trained in the first training iteration. The method may include receiving, by the server, a model update generated from the first training iteration from each computing device of the plurality of computing devices; updating, by the server, the global model based on the model updates generated from the first training iteration. In some embodiments, the method includes subsequent to the first training iteration and prior to the second training iteration, synchronizing, by the server, the global model with the client models of the plurality of computing devices.

In some embodiments, the method includes determining, by the server, a variation in the second predictive score ratio of the first computing device and the first predictive score ratio of the first computing device, wherein detecting the anomaly in the first computing device comprises detecting, by the server, the anomaly in the first computing device based on determining the variation exceeds a variation threshold. In some embodiments, the method includes determining, by the server, a first homogeneity score of a first training data set used to train the client model of the first computing device in the first training iteration and a second homogeneity score of a second training data set used to train the client model of the first computing device in the second training iteration; and determining, by the server, a difference between the first homogeneity score and the second homogeneity score is less than a homogeneity threshold, wherein detecting the anomaly in the first computing device comprises detecting, by the server, the anomaly in the first computing device responsive to (i) the determining the variation is less than the variation threshold, and (ii) the determining the difference between the first homogeneity score and the second homogeneity score is less than the homogeneity threshold. In some embodiments, the method includes determining, by the server, a variation in the second predictive score ratio of the first computing device and the first predictive score ratio of the first computing device, wherein detecting the anomaly in the first computing device comprises detecting, by the server, the anomaly in the first computing device based on determining the variation is less than a variation threshold; and flagging, by the server, the first computing device as a computing device at risk responsive to (i) the determining the variation is less than the variation threshold, and (ii) determining the second predictive score ratio of the first computing device is different from the second predictive score ratio of the second computing device by the amount above the difference threshold.

In some embodiments, the first computing device and the second computing device are computing devices of a plurality of computing devices, each of the plurality of computing devices storing a client model trained in the first training iteration and the second training iteration. Detecting the anomaly in the first computing device may include identifying, by the server based on the first training iteration, a cluster of computing devices of the plurality of computing devices based on each computing device of the cluster having a client model that generates a first output with a first predictive score ratio compared to the first output of the global model within the cluster threshold of each other, the cluster comprising the first computing device and the second computing device; determining, by the server based on the second training iteration, a plurality of second predictive score ratios between second outputs of the client models of the computing devices of the cluster and the second output of the global model; determining, by the server, a calculated predictive score as a function of one or more second predictive score ratios of the cluster of computing devices other than the first computing device; and detecting, by the server, the anomaly in the first computing device responsive to the second predictive score ratio of the first computing device being different from the calculated predictive score by the amount above the difference threshold. In some embodiments, the method includes determining the calculated predictive score comprises determining, by the server, an average or a median of the one or more second predictive score ratios.

Another aspect of a technical solution to the problems described herein is directed to a system. The system may include one or more processors. The one or more processors may be configured by machine-readable instructions to transmit a first client model to a first computing device and a second client model to a second computing device, wherein, in a first training iteration, the first computing device trains the first client model and the second computing device trains the second client model; determine, based on the first training iteration, (i) a first predictive score ratio for the first computing device by comparing a first output of the first client model with a first output of a global model, and (ii) a first predictive score ratio for the second computing device by comparing a first output of the second client model with the first output of the global model; determine the first computing device and the second computing device match responsive to determining the first predictive score ratio for the first computing device and the first predictive score ratio for the second computing device are within a cluster threshold of each other, wherein, in a second training iteration subsequent to the first training iteration, the first computing device trains the first client model and the second computing device trains the second client model; determine, based on the second training iteration, (i) a second predictive score ratio for the first computing device by comparing a second output of the first client model with a second output of the global model, and (ii) a second predictive score ratio for the second computing device by comparing a second output of the second client model with the second output of the global model; and detect an anomaly in the first computing device responsive to (i) the determining the first computing device and the second computing device match, and (ii) determining the second predictive score ratio for the first computing device exceeds the second predictive score ratio for the second computing device by an amount above a difference threshold.

In some embodiments, the one or more processors are configured to receive a model update generated from the second training iteration at the first computing device; and discard the model update responsive to the identification of the anomaly in the first computing device. In some embodiments, the first computing device and the second computing device are computing devices of a plurality of computing devices, each of the plurality of computing devices storing a client model trained in the first training iteration and the second training iteration. The one or more computing devices may be configured to receive a model update generated from the second training iteration at each computing device of the plurality of computing devices; and update the global model based on each of the model updates generated from the second training iteration except for the model update of the first computing device.

In some embodiments, in the first training iteration, the first computing device trains the first client model by sampling a defined number of data points from a first memory of the first computing device and the second computing device trains the second client model by sampling the defined number of data points from a second memory of the second computing device.

Another aspect of a technical solution to the problems described herein is directed to a method. The method may include transmitting, by a server, a client model to a computing device, wherein the computing device trains the client model using a first training data set in a first training iteration; receiving, by the server, labels for the first training data set from the computing device; determining, by the server, a first homogeneity score for the computing device based on a first frequency of a first class label for the first training data set compared to a frequency of one or more other class labels for the first training data set, wherein the computing device trains the client model using a second training data set in a second training iteration; determining, by the server based on the second training iteration, a second homogeneity score for the client model based on a second frequency of the first class label or a second class label for the second training data set for the computing device compared with a frequency of one or more other class labels for the second training data set for the computing device; and identifying, by the server, the computing device as an anomalous computing device based on the second homogeneity score exceeding the first homogeneity score for the computing device below a homogeneity threshold.

In some embodiments, the method includes receiving, by the server, a model update generated from the second training iteration at the anomalous computing device; and discarding, by the server, the model update responsive to the identification of the anomalous computing device as anomalous. In some embodiments, the method includes receiving, by the server, a second model update generated by a second client model during the second training iteration; and updating, by the server, the global model based on the second model update generated by the second client model and not the model update of the anomalous computing device from the second training iteration.

In some embodiments, the method includes receiving, by the server, a model update generated by the client model; updating, by the server, the global model based on the model update; and synchronizing, by the server, the updated global model with the client model responsive to the updating the global model. In some embodiments, the method includes determining, by the server, a frequency of a third class label and a plurality of frequencies for a plurality of class labels within a third training data set used to train a second client model of a second computing device in the first training iteration or the second training iteration; comparing, by the server, the frequency of the third class label with the plurality of frequencies; and determining, by the server, the second computing device is an anomalous computing device responsive to determining the third frequency exceeds the plurality of frequencies by a frequency threshold.

In some embodiments, the method includes identifying, by the server based on the first training iteration, a cluster of computing devices of a plurality of computing devices based on each computing device of the cluster of computing devices having a client model that generates a first output with a first predictive score ratio compared to a first output of the global model within a cluster threshold of each other; and determining, by the server based on the second training iteration, second predictive score ratios between second outputs of the client models of the computing devices of the cluster of computing devices and a second output of the global model, wherein identifying the anomalous computing device comprises identifying, by the server, the anomalous computing device as anomalous responsive to (i) the anomalous computing device having a second predictive score ratio different from one or more second predictive score ratios of the cluster of computing devices by an amount above a difference threshold and (ii) the anomalous computing device having a second homogeneity score exceeding a first homogeneity score for the anomalous computing device below a homogeneity threshold. In some embodiments, identifying the computing device as an anomalous computing device comprises determining, by the server, the computing device is a medium risk based on the computing device having a second homogeneity score exceeding the first homogeneity score for the anomalous computing device below the homogeneity threshold but above a second homogeneity threshold.

These and other aspects and implementations are discussed in detail herein. The detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the computing devices 102-106 or the federated learning system 108) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
   transmitting, by a server, a first client model to a first computing device and a second client model to a second computing device,
      wherein, in a first training iteration, the first computing device trains the first client model and the second computing device trains the second client model;
   determining, by the server based on the first training iteration, (i) a first predictive score ratio for the first computing device by comparing a first output of the first client model with a first output of a global model, and (ii) a first predictive score ratio for the second computing device by comparing a first output of the second client model with the first output of the global model;
   determining, by the server, the first computing device and the second computing device match responsive to determining the first predictive score ratio for the first computing device and the first predictive score ratio for the second computing device are within a cluster threshold of each other,
      wherein, in a second training iteration subsequent to the first training iteration, the first computing device trains the first client model and the second computing device trains the second client model;
   determining, by the server based on the second training iteration, (i) a second predictive score ratio for the first computing device by comparing a second output of the first client model with a second output of the global model, and (ii) a second predictive score ratio for the second computing device by comparing a second output of the second client model with the second output of the global model; and
   detecting, by the server, an anomaly in the first computing device responsive to (i) the determining the first computing device and the second computing device match, and (ii) determining the second predictive score ratio for the first computing device exceeds the second predictive score ratio for the second computing device by an amount above a difference threshold.

2. The method of claim 1, comprising:
   receiving, by the server, a model update generated from the second training iteration at the first computing device; and
   discarding, by the server, the model update responsive to detecting the anomaly in the first computing device.

3. The method of claim 1, wherein the first computing device and the second computing device are computing devices of a plurality of computing devices, each of the plurality of computing devices storing a client model trained in the first training iteration and the second training iteration, the method comprising:
   receiving, by the server, a model update generated from the second training iteration at each computing device of the plurality of computing devices; and updating, by the server, the global model based on each of the model updates generated from the second training iteration except for the model update of the first computing device.

4. The method of claim 1, wherein the first computing device and the second computing device are computing devices of a plurality of computing devices, each of the plurality of computing devices storing a client model trained in the first training iteration, the method comprising:
receiving, by the server, a model update generated from the first training iteration from each computing device of the plurality of computing devices; and
updating, by the server, the global model based on the model updates generated from the first training iteration.

5. The method of claim 4, comprising:
subsequent to the first training iteration and prior to the second training iteration, synchronizing, by the server, the global model with the client models of the plurality of computing devices.

6. The method of claim 1, comprising:
determining, by the server, a variation in the second predictive score ratio of the first computing device and the first predictive score ratio of the first computing device,
wherein detecting the anomaly in the first computing device comprises detecting, by the server, the anomaly in the first computing device based on determining the variation exceeds a variation threshold.

7. The method of claim 6, comprising:
determining, by the server, a first homogeneity score of a first training data set used to train the client model of the first computing device in the first training iteration and a second homogeneity score of a second training data set used to train the client model of the first computing device in the second training iteration; and
determining, by the server, a difference between the first homogeneity score and the second homogeneity score is less than a homogeneity threshold,
wherein detecting the anomaly in the first computing device comprises detecting, by the server, the anomaly in the first computing device responsive to (i) the determining the variation is less than the variation threshold, and (ii) the determining the difference between the first homogeneity score and the second homogeneity score is less than the homogeneity threshold.

8. The method of claim 1, comprising:
determining, by the server, a variation in the second predictive score ratio of the first computing device and the first predictive score ratio of the first computing device,
wherein detecting the anomaly in the first computing device comprises detecting, by the server, the anomaly in the first computing device based on determining the variation is less than a variation threshold; and
flagging, by the server, the first computing device as a computing device at risk responsive to (i) the determining the variation is less than the variation threshold, and (ii) determining the second predictive score ratio of the first computing device is different from the second predictive score ratio of the second computing device by the amount above the difference threshold.

9. The method of claim 1, wherein the first computing device and the second computing device are computing devices of a plurality of computing devices, each of the plurality of computing devices storing a client model trained in the first training iteration and the second training iteration, and wherein detecting the anomaly in the first computing device comprises:
identifying, by the server based on the first training iteration, a cluster of computing devices of the plurality of computing devices based on each computing device of the cluster having a client model that generates a first output with a first predictive score ratio compared to the first output of the global model within the cluster threshold of each other, the cluster comprising the first computing device and the second computing device;
determining, by the server based on the second training iteration, a plurality of second predictive score ratios between second outputs of the client models of the computing devices of the cluster and the second output of the global model;
determining, by the server, a calculated predictive score as a function of one or more second predictive score ratios of the cluster of computing devices other than the first computing device; and
detecting, by the server, the anomaly in the first computing device responsive to the second predictive score ratio of the first computing device being different from the calculated predictive score by the amount above the difference threshold.

10. The method of claim 9, wherein determining the calculated predictive score comprises determining, by the server, an average or a median of the one or more second predictive score ratios.

11. A system, the system comprising:
one or more processors configured by machine-readable instructions to:
transmit a first client model to a first computing device and a second client model to a second computing device,
wherein, in a first training iteration, the first computing device trains the first client model and the second computing device trains the second client model;
determine, based on the first training iteration, (i) a first predictive score ratio for the first computing device by comparing a first output of the first client model with a first output of a global model, and (ii) a first predictive score ratio for the second computing device by comparing a first output of the second client model with the first output of the global model;
determine the first computing device and the second computing device match responsive to determining the first predictive score ratio for the first computing device and the first predictive score ratio for the second computing device are within a cluster threshold of each other,
wherein, in a second training iteration subsequent to the first training iteration, the first computing device trains the first client model and the second computing device trains the second client model;
determine, based on the second training iteration, (i) a second predictive score ratio for the first computing device by comparing a second output of the first client model with a second output of the global model, and (ii) a second predictive score ratio for the second computing device by comparing a second output of the second client model with the second output of the global model; and
detect an anomaly in the first computing device responsive to (i) the determining the first computing device and the second computing device match, and (ii) determining the second predictive score ratio for the first computing device exceeds the second predictive score ratio for the second computing device by an amount above a difference threshold.

12. The system of claim 11, wherein the one or more processors are configured to:
receive a model update generated from the second training iteration at the first computing device; and
discard the model update responsive to detecting the anomaly in the first computing device.

13. The system of claim 11, wherein, in the first training iteration, the first computing device trains the first client model by sampling a defined number of data points from a first memory of the first computing device and the second computing device trains the second client model by sampling the defined number of data points from a second memory of the second computing device.

14. A method, comprising:
transmitting, by a server, a client model to a computing device,
wherein the computing device trains the client model using a first training data set in a first training iteration;
receiving, by the server, labels for the first training data set from the computing device;
determining, by the server, a first homogeneity score for the computing device based on a first frequency of a first class label for the first training data set compared to a frequency of one or more other class labels for the first training data set,
wherein the computing device trains the client model using a second training data set in a second training iteration;
determining, by the server based on the second training iteration, a second homogeneity score for the client model based on a second frequency of the first class label or a second class label for the second training data set for the computing device compared with a frequency of one or more other class labels for the second training data set for the computing device; and
identifying, by the server, the computing device as an anomalous computing device based on the second homogeneity score exceeding the first homogeneity score for the computing device below a homogeneity threshold.

15. The method of claim 14, comprising:
receiving, by the server, a model update generated from the second training iteration at the anomalous computing device; and
discarding, by the server, the model update responsive to the identification of the anomalous computing device as anomalous.

16. The method of claim 15, comprising:
receiving, by the server, a second model update generated by a second client model during the second training iteration; and updating, by the server, a global model based on the second model update generated by the second client model and not the model update of the anomalous computing device from the second training iteration.

17. The method of claim 14, comprising:
receiving, by the server, a model update generated by the client model;
updating, by the server, a global model based on the model update; and
synchronizing, by the server, the updated global model with the client model responsive to the updating the global model.

18. The method of claim 14, comprising:
determining, by the server, a frequency of a third class label and a plurality of frequencies for a plurality of class labels for a third training data set used to train a second client model of a second computing device in the first training iteration or the second training iteration;
comparing, by the server, the frequency of the third class label with the plurality of frequencies; and
determining, by the server, the second computing device is an anomalous computing device responsive to determining the third frequency exceeds the plurality of frequencies by a frequency threshold.

19. The method of claim 14, comprising:
identifying, by the server based on the first training iteration, a cluster of computing devices of a plurality of computing devices based on each computing device of the cluster of computing devices having a client model that generates a first output with a first predictive score ratio compared to a first output of a global model within a cluster threshold of each other; and
determining, by the server based on the second training iteration, second predictive score ratios between second outputs of the client models of the computing devices of the cluster of computing devices and a second output of the global model,
wherein identifying the anomalous computing device comprises identifying, by the server, the anomalous computing device as anomalous responsive to (i) the anomalous computing device having a second predictive score ratio different from one or more second predictive score ratios of the cluster of computing devices by an amount above a difference threshold and (ii) the anomalous computing device having a second homogeneity score exceeding a first homogeneity score for the anomalous computing device below a homogeneity threshold.

20. The method of claim 14, wherein identifying the computing device as an anomalous computing device comprises determining, by the server, the computing device is a medium risk based on the computing device having a second homogeneity score exceeding the first homogeneity score for the anomalous computing device below the homogeneity threshold but above a second homogeneity threshold.

* * * * *